US012613619B2

(12) United States Patent
Szczepański et al.

(10) Patent No.: US 12,613,619 B2
(45) Date of Patent: Apr. 28, 2026

(54) WEB MEETING INTEGRATIONS WITH CONTENT MANAGEMENT SYSTEMS

(71) Applicant: Box, Inc., Redwood City, CA (US)

(72) Inventors: Rafał Szczepański, Warsaw (PL);
Raymond Huie, Oakland, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 17/816,324

(22) Filed: Jul. 29, 2022

(65) Prior Publication Data

US 2024/0036710 A1 Feb. 1, 2024

(51) Int. Cl.
| | |
|---|---|
| *G06F 3/00* | (2006.01) |
| *G06F 3/0482* | (2013.01) |
| *G06F 3/0484* | (2022.01) |
| *G06F 40/169* | (2020.01) |

(52) U.S. Cl.
CPC .......... *G06F 3/0484* (2013.01); *G06F 3/0482* (2013.01); *G06F 40/169* (2020.01)

(58) Field of Classification Search
CPC ..... G06F 3/0484; G06F 40/169; G06F 3/0482
See application file for complete search history.

(56) References Cited

U.S. PATENT DOCUMENTS

| | | | | |
|---|---|---|---|---|
| 7,536,637 | B1 * | 5/2009 | Nauerz | ................. G06F 16/958 |
| | | | | 715/744 |
| 8,806,354 | B1 | 8/2014 | Hyndman et al. | |
| 9,489,114 | B2 | 11/2016 | Coplen et al. | |

| | | | |
|---|---|---|---|
| 9,942,519 | B1 | 4/2018 | Pan et al. |
| 10,812,279 | B1 | 10/2020 | Walters et al. |
| 11,405,225 | B1 | 8/2022 | Bansal et al. |

(Continued)

FOREIGN PATENT DOCUMENTS

WO      WO 2018/170498 A1      9/2018

OTHER PUBLICATIONS

Notice of Allowance dated Dec. 20, 2022 for U.S. Appl. No. 17/816,329.

(Continued)

*Primary Examiner* — Jessica S Manno
*Assistant Examiner* — Andrew Chung
(74) *Attorney, Agent, or Firm* — Vista IP Law Group, LLP

(57) ABSTRACT

Methods, systems, and computer program products. A virtual canvas is presented in an active area of an online meeting facility that renders participant-specific online virtual canvas interactions raised by a respective plurality of users' devices. Users can see and hear each other's interactions during an virtual canvas session. Annotations include drawings, content object edits, voice annotations, etc. that correspond to a displayed portion of a content object of a content management system (CMS). Based on the interactions and/or inferences made based on those interactions, the virtual canvas system generates commands to be executed by the content management system. Characteristics of interactions between users can be enriched by drawing information from the content management system and using such information in combination with the interactions themselves. The CMS can recommend teams, and action items, and the CMS can provide hints to participants, so as to facilitate more effective engagement between the participants.

21 Claims, 19 Drawing Sheets

(56)  References Cited

U.S. PATENT DOCUMENTS

| 2010/0058201 | A1* | 3/2010 | Harvey | G06Q 10/10 |
| | | | | 715/753 |
| 2010/0174577 | A1 | 7/2010 | Duffy et al. | |
| 2013/0293584 | A1 | 11/2013 | Anderson | |
| 2014/0331265 | A1 | 11/2014 | Mozell et al. | |
| 2015/0309978 | A1* | 10/2015 | Howell | G06F 40/169 |
| | | | | 715/230 |
| 2018/0007100 | A1 | 1/2018 | Krasadakis | |
| 2018/0096752 | A1 | 4/2018 | Ovalle et al. | |
| 2018/0109574 | A1 | 4/2018 | Vigoda et al. | |
| 2018/0189706 | A1 | 7/2018 | Newhouse et al. | |
| 2019/0108494 | A1* | 4/2019 | Nelson | G06Q 10/1095 |
| 2019/0273767 | A1 | 9/2019 | Nelson et al. | |
| 2020/0264905 | A1* | 8/2020 | Fox | G06F 9/451 |
| 2021/0157817 | A1 | 5/2021 | Allen et al. | |
| 2021/0176429 | A1 | 6/2021 | Peters et al. | |
| 2021/0295637 | A1 | 9/2021 | Ovalle | |
| 2021/0319408 | A1 | 10/2021 | Jorasch et al. | |
| 2021/0342785 | A1 | 11/2021 | Mann et al. | |
| 2021/0399911 | A1 | 12/2021 | Jorasch et al. | |
| 2021/0400142 | A1 | 12/2021 | Jorasch et al. | |
| 2022/0083308 | A1* | 3/2022 | Morris | H04L 63/107 |
| 2022/0255995 | A1* | 8/2022 | Berliner | G06F 3/04883 |
| 2023/0025808 | A1 | 1/2023 | Gupta et al. | |

OTHER PUBLICATIONS

"Whiteboard API," WhiteboardTeam, Copyright 2021.
Noureen, R., "Microsoft Whiteboard gets new collaboration features on all platforms," onmsft.com, dated Oct. 30, 2021.
Notice of allowance dated Oct. 20, 2025 for U.S. Appl. No. 18/135,492.
Non-Final Office Action dated Mar. 27, 2025 for U.S. Appl. No. 18/135,492.

* cited by examiner

1A00

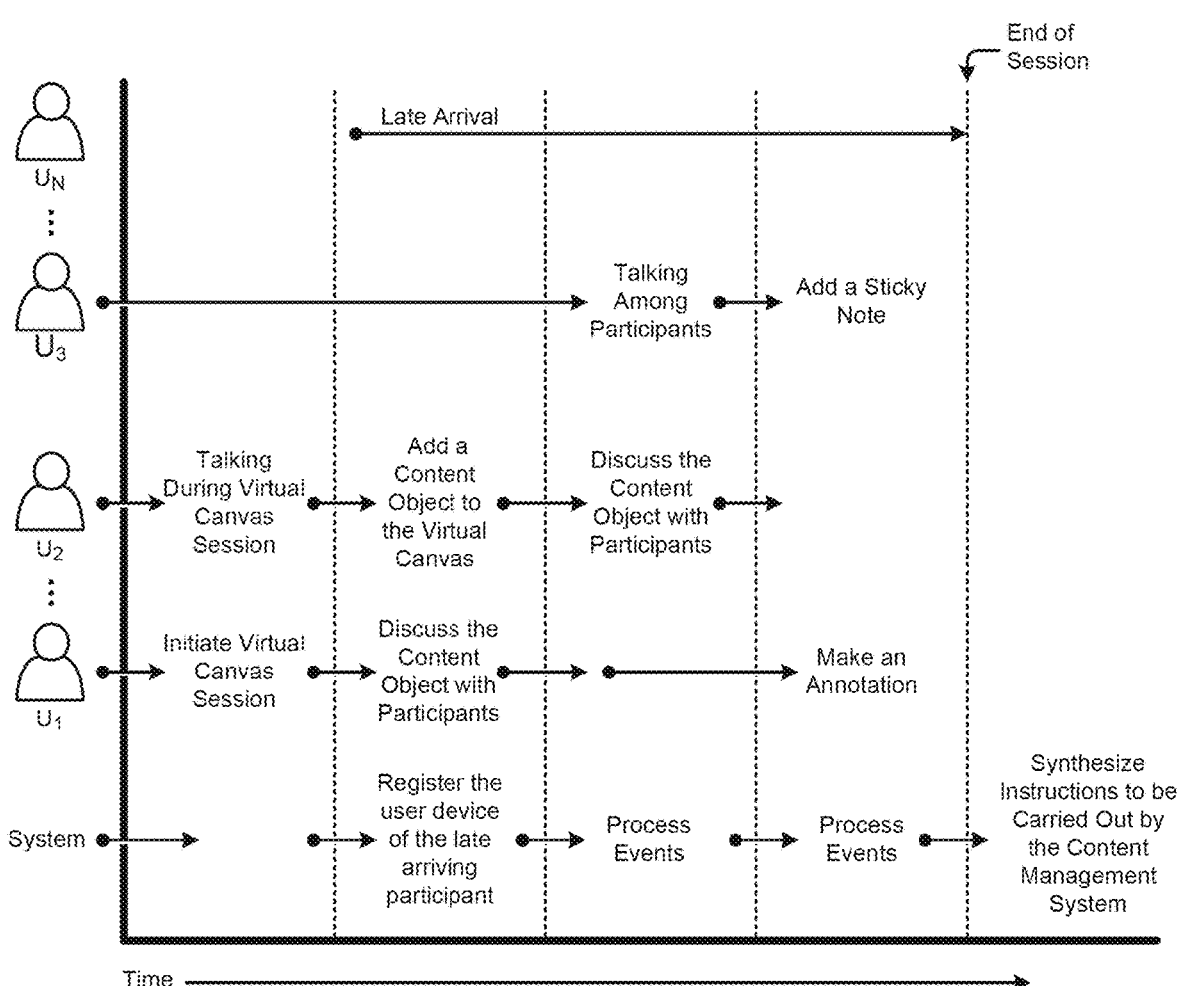
FIG. 1B

1C00

| Desired Result | CMS Operations | Triggers | Inference Inputs |
|---|---|---|---|
| Add a New Content Object to the CMS | • Add new content object to CMS | • Non-CMS user upload<br>• Sketch | • Virtual canvas events |
| Add New Metadata to the CMS | • Add new metadata to CMS | • Participant comments<br>• Engagement metric | • Natural language processor outputs |
| Make a Change to Existing Metadata | • Modify existing metadata item<br>• Augment with new values | • Dynamically-constituted team | • Virtual canvas events<br>• Content of comments |
| Establish a New Collaboration Group | • Construct new collaboration group<br>• Generate proxy user | • Team formulation | • Outputs of team optimizer |
| Make a Change to an Existing Collaboration Group | • Add a CMS user<br>• Add a proxy for a non-CMS user<br>• Collaboration group proposal | • Cross-functional team formulation<br>• Engagement by non-CMS user | • History of CMS user<br>• History of non-CMS user<br>• Historical engagement graph |
| Make a Change to CMS Workflow Data Item | • Action item corresponds to workflow entry point<br>• Mark workflow stage gate completion | • Workflow object query results<br>• Current workflow stage gate state | • Trigger workflow progression<br>• Trigger task assignment |
| Assign a task to a Participant | • A task item corresponds to a content object which corresponds to a workflow stage gate | • Assign the task to a primary participant<br>• Assign the task to a backup participant | • Workflow stage gate entry<br>• Workflow stage gate completion |

FIG. 1D

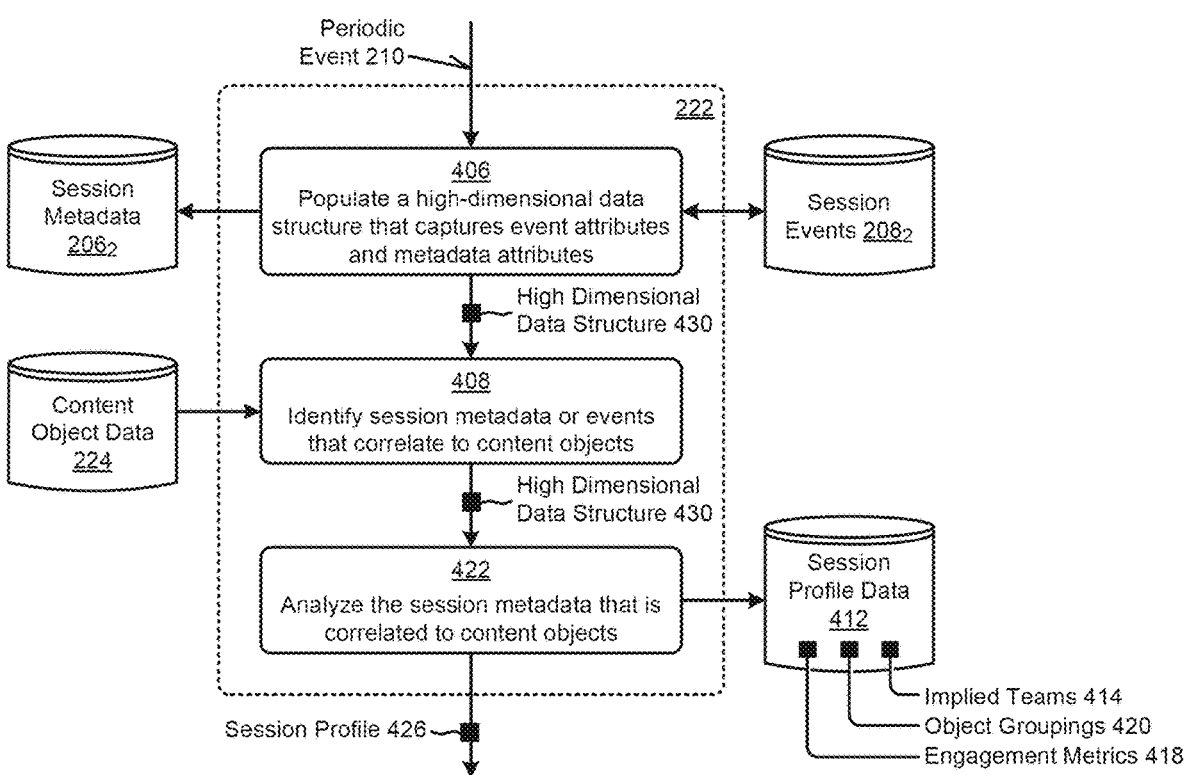
FIG. 4

6B00

6C00

7A00

7B00

Virtual Canvas Display Area 110

Interaction 716_{UN}
Interaction 716_{U2}
Interaction 716_{U1}

FOR EACH interaction:

752
Determine the participants who raised other contemporaneous interaction events 754
Form participant pairings

END FOR

FOR EACH participant paring:

Query 765

Subject Participant 764

Content Management System Metadata 134

Paired Participant 766

756
Consult the CMS to gather enrichment data about the participant pair

Enrichment Data 762
— Common Workflows
— Common Collabs
— Common Objects

758
Make inferences based on the enrichment data

760
Emit a recommendation based on the inferences

END FOR

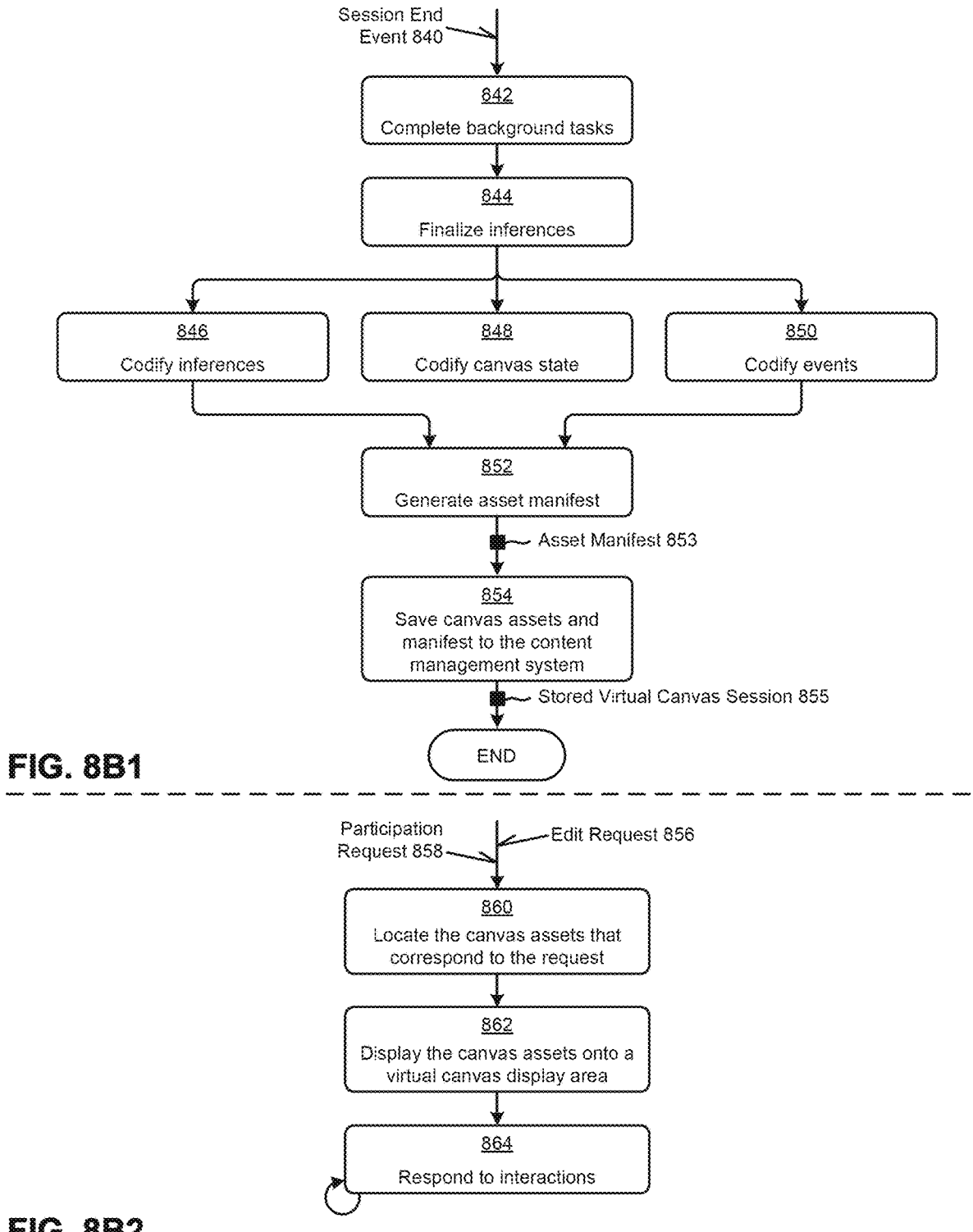
FIG. 8B1
FIG. 8B2

9A00

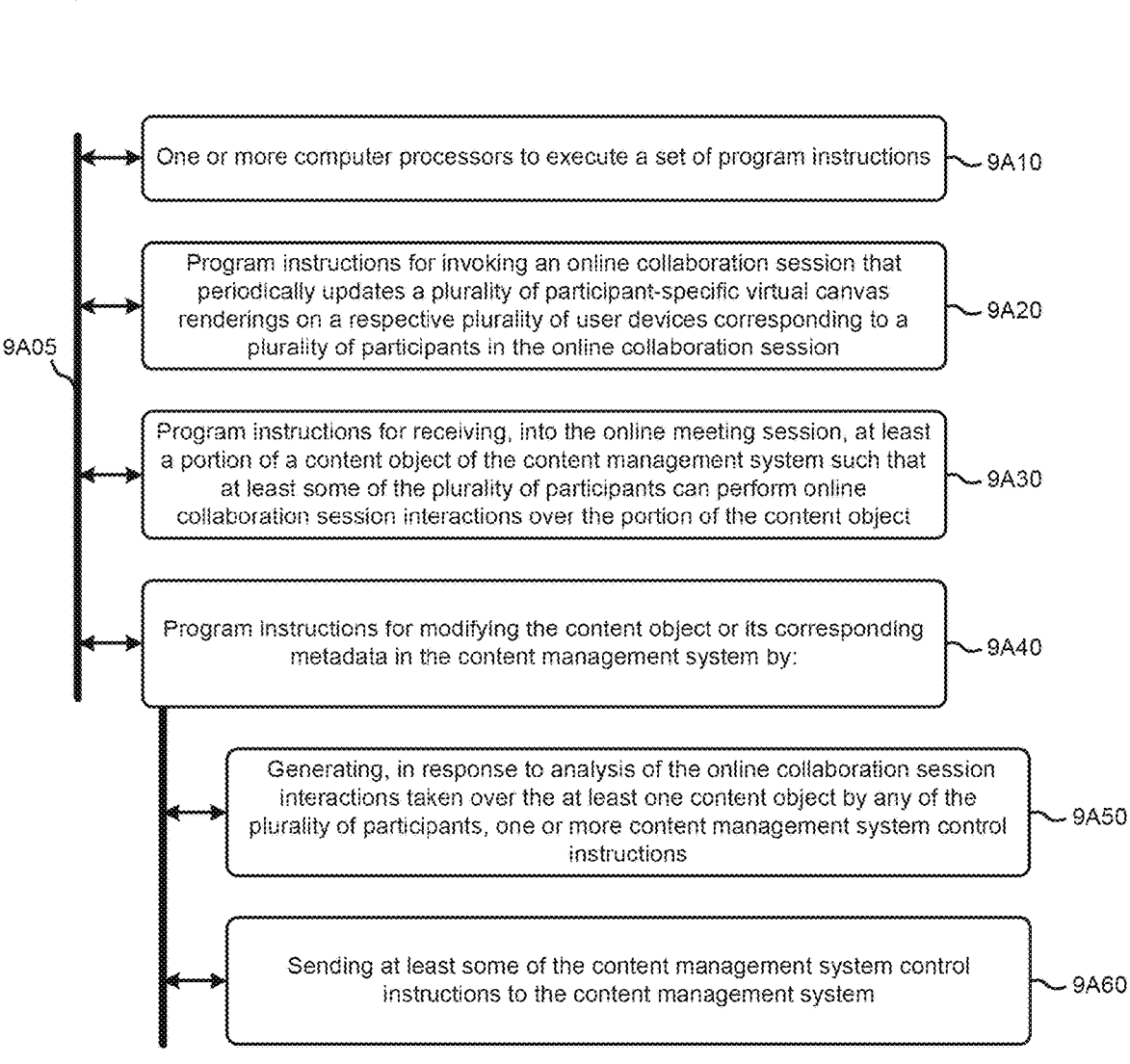

9A05

One or more computer processors to execute a set of program instructions ~9A10

Program instructions for invoking an online collaboration session that periodically updates a plurality of participant-specific virtual canvas renderings on a respective plurality of user devices corresponding to a plurality of participants in the online collaboration session ~9A20

Program instructions for receiving, into the online meeting session, at least a portion of a content object of the content management system such that at least some of the plurality of participants can perform online collaboration session interactions over the portion of the content object ~9A30

Program instructions for modifying the content object or its corresponding metadata in the content management system by: ~9A40

Generating, in response to analysis of the online collaboration session interactions taken over the at least one content object by any of the plurality of participants, one or more content management system control instructions ~9A50

Sending at least some of the content management system control instructions to the content management system ~9A60

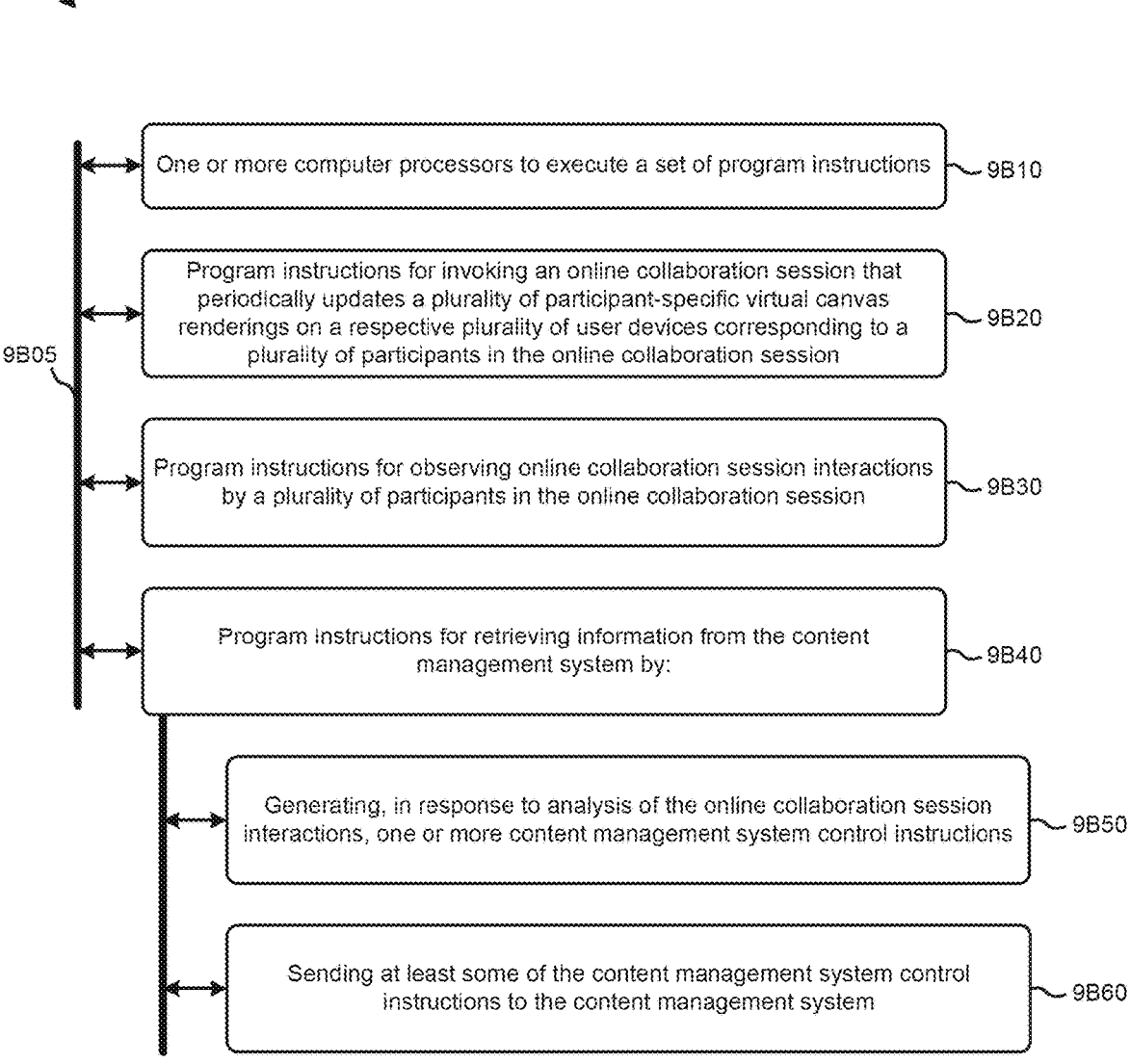

One or more computer processors to execute a set of program instructions ~9B10

Program instructions for invoking an online collaboration session that periodically updates a plurality of participant-specific virtual canvas renderings on a respective plurality of user devices corresponding to a plurality of participants in the online collaboration session ~9B20

Program instructions for observing online collaboration session interactions by a plurality of participants in the online collaboration session ~9B30

Program instructions for retrieving information from the content management system by: ~9B40

Generating, in response to analysis of the online collaboration session interactions, one or more content management system control instructions ~9B50

Sending at least some of the content management system control instructions to the content management system ~9B60

WEB MEETING INTEGRATIONS WITH CONTENT MANAGEMENT SYSTEMS

RELATED APPLICATIONS

The present application is related to U.S. patent application Ser. No. 17/816,329 titled "CONTENT MANAGEMENT SYSTEM INTEGRATIONS WITH WEB MEETINGS", filed on even date herewith, which is hereby incorporated by reference in its entirety.

TECHNICAL FIELD

This disclosure relates to online collaboration systems, and more particularly to techniques for integrating web meeting facilities with content management systems.

BACKGROUND

In recent years, electronic collaboration systems have gained popularity. Today, any number of people associated with any number of organizations can come together in an electronic collaboration session such that they can speak to each other (e.g., using voice over IP), and such that they can see each other on a computer screen. In some cases, facilities are provided such that they can perform computer-to-computer interactions using user interface devices (e.g., pointer devices, mice, touchscreens, keyboards, etc.) to make entries into and/or to manipulate screen devices (e.g., electronic whiteboards, shared chat conversations, etc.). In some settings (e.g., in high-tech workplaces), online meetings have nearly replaced in-person meetings. In fact, there are myriad situations where online meetings are the preferred mode of group communication.

Some web meeting facilities support uploading of files "into" to a virtual meeting area in a manner that allows sharing of the contents of the file with the participants in the online web meeting. For example, a participant might upload a file from his/her laptop such that the other participants can see the contents of the uploaded file (e.g., a preview view) on the display surface of their respective user devices.

Concurrent with the rapid adoption of virtual meetings has been the rapid adoption of content management systems. Content management systems go well beyond mere file systems, at least in that content management systems keep track of a wealth of information about how a particular content object (e.g., file) is being shared and accessed.

Unfortunately, even the most modern web meeting systems fail to take advantage of the existence of the wealth of information stored in content management systems. Therefore, what is needed is a technique or techniques that address these deficiencies.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for virtual meeting integrations with content management systems, which techniques advance the relevant technologies to address technological issues with legacy approaches. More specifically, the present disclosure describes techniques used in systems, methods, and in computer program products for real-time control of a content management system based on participant interactions with an online virtual canvas user interface. Certain embodiments are directed to technological solutions for using the facilities of a content management system to improve the quality of collaborative interactions during online meetings.

The ordered combination of steps of the embodiments serve in the context of practical applications that perform steps for using the facilities of a content management system to improve the quality of collaborative interactions during online meetings. These techniques overcome long-standing yet heretofore unsolved technological problems associated with integrating virtual meetings with content management systems.

Some of the herein-disclosed embodiments for using the facilities of a content management system to improve the quality of collaborative interactions during online meetings are technological solutions pertaining to technological problems that arise in the hardware and software arts that underlie online collaboration systems. Furthermore, some of the herein-disclosed embodiments for using the facilities of online meetings pertain to improving the utility of a content management system. are also technological solutions that pertain to technological problems that arise in the hardware and software arts. Aspects of the present disclosure achieve performance and other improvements in peripheral technical fields including, but not limited to, human-machine interfaces and recommendation systems.

Some embodiments include a sequence of instructions that are stored on a non-transitory computer readable medium. Such a sequence of instructions, when stored in memory and executed by one or more processors, causes the one or more processors to perform a set of acts for using the facilities of a content management system to improve the quality of collaborative interactions during online meetings.

Some embodiments include the aforementioned sequence of instructions that are stored in a memory, which memory is interfaced to one or more processors such that the one or more processors can execute the sequence of instructions to cause the one or more processors to implement acts for using the facilities of a content management system to improve the quality of collaborative interactions during online meetings.

In various embodiments, any combinations of any of the above can be organized to perform any variation of acts for real-time control of a content management system based on participant interactions with an online virtual canvas user interface, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B exemplifies a time progression scenario from inception to conclusion of an online collaboration session, according to an embodiment.

FIG. 1D presents a sampling of CMS control instruction types that can be raised in an online collaboration session and carried out by a content management system, according to an embodiment.

FIG. 4 presents an online collaboration session profile generation technique as used in systems that raise CMS control instructions to be carried out by a content management system, according to an embodiment.

FIG. 7B depicts an interaction event enrichment technique as used in systems that infer emit recommendations based on virtual canvas user interactions, according to an embodiment.

FIG. 8B1 and FIG. 8B2 exemplify an online collaboration environment that is configured to save virtual canvas assets and a corresponding manifest, according to an embodiment.

FIG. 9A and FIG. 9B depict system components as arrangements of computing modules that are interconnected so as to implement certain of the herein-disclosed embodiments.

DETAILED DESCRIPTION

Figure 1A:
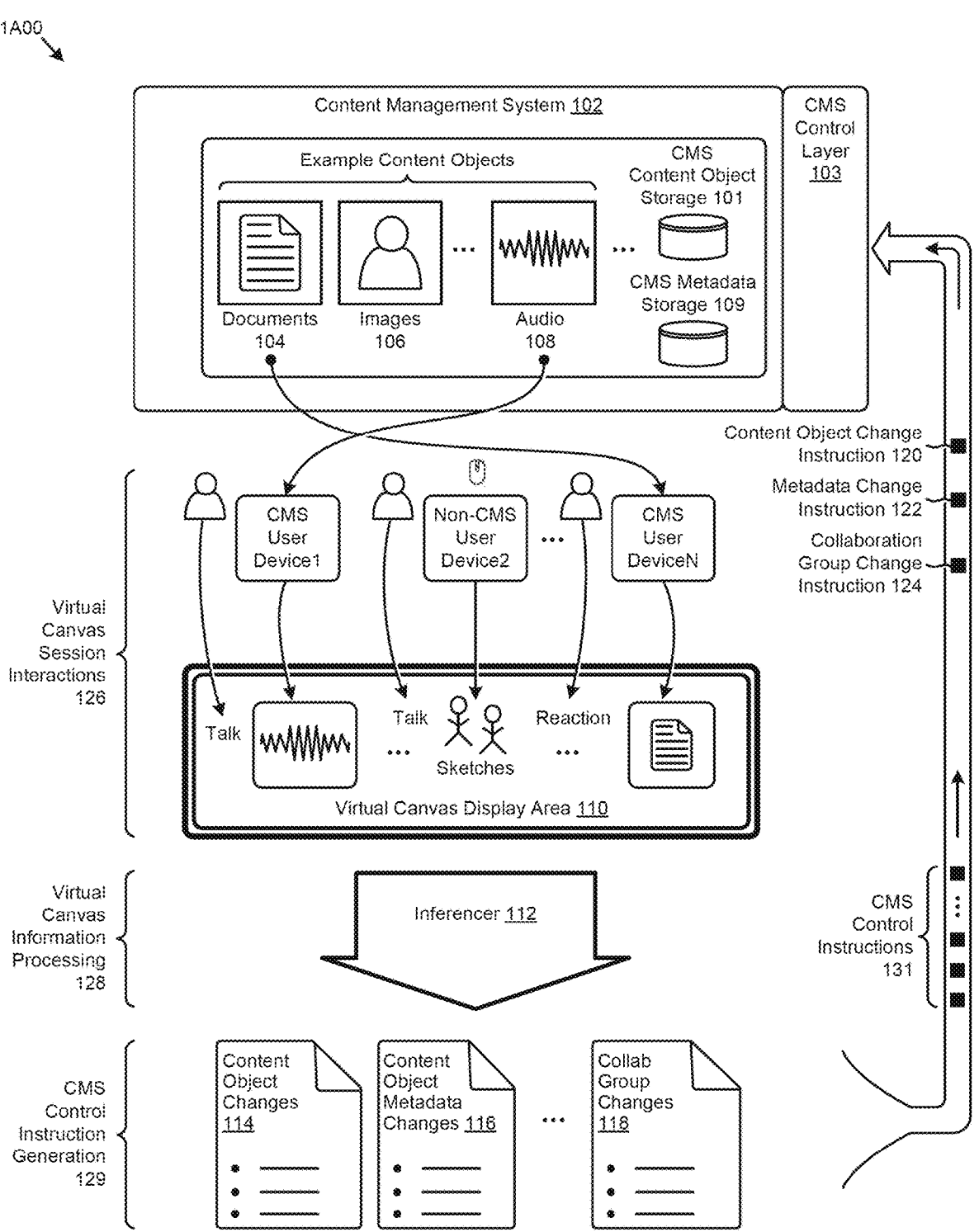
FIG. 1A exemplifies an online collaboration environment that integrates a virtual canvas with a content management system, according to an embodiment.

Aspects of the present disclosure solve problems associated with using computer systems for integrating online web meeting facilities with a content management system. Some embodiments are directed to approaches for using the facilities of a content management system to improve the quality of collaborative interactions during online web meetings. The accompanying figures and discussions herein present example environments, systems, methods, and computer program products for real-time interactions between a content management system and an online virtual canvas user interface.

Overview

Today, any number of people associated with any number of organizations can come together in an online collaboration session such that they can speak to each other (e.g., using voice over IP) and such that they can share using a computer screen (e.g., using a virtual canvas). Often an online meeting facilitator and/or other online participants want to upload files "into" to a virtual canvas session in a manner that allows sharing of the contents of the file with the participants in the online meeting. For example, a facilitator might upload a file such that the other participants can see the contents of the uploaded file (e.g., a preview view) on the display surface of their respective user devices.

While sharing the contents of the file on a surface such as a virtual canvas has its advantages, there are myriad further advantages that can be garnered via implementation of the herein-disclosed integrations between a content management system and an online meeting facility.

To illustrate, since a content management system keeps track of a wealth of information about how a particular content object (e.g., file) is being shared and/or accessed, one integration serves to interrelate information from the content management system with the ongoing collaboration interactions taking place in the virtual meeting (e.g., on or over a virtual canvas). To further illustrate, a virtual meeting can be configured to capture ongoing real-time collaboration activities, and those activities and/or the semantics that underly those activities can be used to manipulate data (e.g., files, metadata, etc.) of the content management system.

Moreover many content management systems are able to access the information inside the content object. As such, when a content management system is configured to be able to keep track of information about how a particular content object is being manipulated, and/or when a content management system is configured to be able to interpret the information inside the content object, then such information is at least potentially available to a virtual meeting facility. Similarly, information that may emerge during the course of a virtual meeting is at least potentially available to a content management system.

The concept of tight integration between an online collaboration session and a content management system is far reaching. Moreover, the herein disclosed techniques for bidirectional integration bring forth hitherto unexploited synergies between an online collaboration session and a content management system. Some of the herein-disclosed techniques involve analysis of collaboration activities in a manner that informs how data at the collaboration system can be manipulated. In the reverse direction, some of the herein-disclosed techniques involve provision of data from the content management system in a manner that informs how collaboration can be improved in the context an online collaboration session.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an online collaboration environment that integrates a virtual canvas with a content management system. As an option, one or more variations of online collaboration environment 1A00 or any aspect thereof may be implemented in the context of the architecture and functionality of the embodiments described herein and/or in any environment.

The figure is being presented to illustrate how content objects (e.g., documents 104, images 106, audio 108) of a content management system (CMS) or its corresponding metadata can be modified in response to analysis of virtual canvas session interactions taken by virtual canvas session participants. More specifically the figure is being presented to illustrate how CMS control instructions 131 are generated.

As used herein, a "content management system" is a collection of executable code that facilitates performance of a set of coordinated functions, tasks, or activities on behalf of a plurality of collaborating users that operate over shared content objects. More specifically, a content management system facilitates collaboration activities such as creating a shared content object and establishing a set of users who can access the shared content object concurrently. In some embodiments as contemplated herein, a "content management system" is implemented as a set of computer-implemented modules that interoperate to capture, store, and provision access to electronically-stored data that comprises a history of events taken over shared content objects. Access by users to individual ones of the content objects of a content management system is controlled by collaboration group settings.

As used herein, a "content object" is any computer-readable, electronically-stored data that is made accessible to a plurality of users of a content management system. Different content management system users may each have respective permissions to access the electronically-stored data. The electronically-stored data may be structured as a file, or as a folder/directory, or as metadata.

As used herein, a "content management system command" or "content management system commands" are an instruction or instructions that are executed in order to carry out a set of operations over a CMS. In various embodiments, content management system commands may be implemented through use of application programming (API) calls. In other embodiments, content management system commands may be implemented through use of middleware that implements application programming (API) calls. In some cases, when a content management system command is executed by an underlying content management system, the execution of the command causes a change to the state (e.g., data state) of the content management system. In other cases, when a content management system command is executed by an underlying content management system, the execution of the command reports a data state of the content management system.

As used herein an "online meeting facility" is a collection of computer executable code that is installed or otherwise configured onto two or more user devices, wherein such executable code is further configured to present two or more live audio/video streams that originate from the two or more user devices. One example of an "online meeting facility" is a computerized system that connects two or more user devices (e.g., a laptops or desktops, or phones or tablets or combinations thereof) over the Internet in a manner that allows users of the two or more user devices to see and hear each other and/or that allows participants to see displayed images and hear sounds that correspond the images and sounds of a presenter's user device. Any of the two or more user devices may serve as a presenter. The images and sounds of a presenter's user device may be bounded by an active area that is defined and maintained by the online meeting facility such that one user's input into the active area can be seen by other users within their respective active areas.

As used herein, an "online meeting session" or "online collaboration session" is formed when two or more user devices have installed or otherwise configured web conferencing code onto respective user devices. An "online meeting session" commences when two or more of the user devices each launch the web conferencing code. The terms "online meeting session" or "online collaboration session" are used interchangeably.

As shown, a content management system 102 is made accessible to user devices (e.g., CMS user device1, non-CMS user device2, CMS user deviceN) such that any portion of CMS content object storage 101 and/or any portion of the CMS metadata storage 109 can be uploaded into a virtual canvas session. Once any one or more of the stored content objects and/or its metadata has been uploaded into a virtual canvas session, users can perform any manner of virtual canvas session interactions 126. For example, the users can talk (e.g., discuss, criticize, correct, etc.) while referring to the uploaded item. As another example, the users can use their user devices, possibly including a pointing device (e.g., mouse, touch screen, etc.) to make sketches that appear on the virtual canvas display area 110 of the user devices.

As used herein, a "virtual canvas" or "online virtual canvas" refers to the active area of an online meeting facility, where the active area includes any displayed or displayable portion of the web conferencing user interface. Such a displayed or displayable portion of the web conferencing user interface can include a whiteboard, a chat facility, an annotation area, an upload area, a gallery of participant avatars, a live audio/video feed, a live editing area, and/or any displayed area that supports user interactions with the web conferencing user interface from a user device. The terms "virtual canvas" and "online virtual canvas" are used interchangeably. In embodiments disclosed herein, an online virtual canvas is configured to display all or portions of a content object of a content management system.

In some embodiments, a web conferencing user interface includes an active area (e.g., a workspace) that implements a whiteboard as used for composing an annotation over a corresponding content object. In some cases the annotations can be displayed on top of any displayed portions of the content object. In some cases the annotations can be actual live editing changes over a content object, which actual live editing changes are displayed as changed portions of the content object. In some cases, a whiteboard or other portion of the active area is implemented as a glassboard that implements a transparent overlay that is rendered in a manner such that a user can add an overlay annotation on top of the transparent overlay. Manipulation of one or more annotation tools (e.g., shape annotation tools, text annotation tools) or in some cases, merely dragging a finger or a mouse or other pointing device over the glassboard leaves a visible overlay annotation. As used herein, a "glassboard" is an invisible or transparent layer or semi-transparent layer that is juxtaposed between a lower display layer and a higher layer comprising one or more overlay annotations that are registered with respect to the lower display layer.

As used herein, an "annotation" or "overlay annotation" or "glassboard annotation" refers to a visible mark or audible utterance produced by a user via a user device. An annotation can be a visible drawing or sketch made by a participant, or an annotation can be a visible icon made by or caused by a participant (e.g., by operation of a virtual canvas tool).

Further details regarding general approaches to making annotations are described in U.S. Patent No. 11,374,990 titled "SAVING AN OVERLAY ANNOTATION IN ASSOCIATION WITH A SHARED DOCUMENT" issued on Jun. 28, 2022, which is hereby incorporated by reference in its entirety.

Any one or more of the heretofore mentioned virtual canvas session interactions, whether considered singly or in combination, can be received as input into an inferencer 112. The inferencer is configured to perform virtual canvas information processing 128 so as to interpret the virtual canvas session interactions and generate CMS control instructions 131. Such CMS control instructions may correspond to content object changes 114 that are to be applied at the CMS, and/or content object metadata changes 116 that are to be applied at the CMS, and/or collaboration group changes 118.

The inferencer 112 is configured to be able to process a wide range of virtual canvas session interactions. Table 1 is presented below to exemplify some possible inferencer inputs (e.g., virtual canvas session interactions). Table 2 is presented below to exemplify some possible inferencer outputs (e.g., CMS control instructions).

TABLE 1

| Inferencer inputs | |
| --- | --- |
| Inferencer Inputs | Example Processing |
| Talk/discussion | Speech-to-text and word clustering |
| Sketches | Optical character recognition, object recognition |
| Talk/discussion in combination with sketches | Relationships between words and objects |
| User reactions (e.g., based on raised icons, and/or voting, and/or pointer device activity, and/or voting actions, etc.) | Derive weights or strength of certain actions relative to other reactions. |

TABLE 2

| Inferencer outputs | |
| --- | --- |
| Inferencer Outputs | Description |
| List of registered CMS users corresponding to canvas session interactions | Identify CMS users who are associated with any of the virtual canvas session interactions |
| Inferred action items | Textual description of a "To Do" item or codification of a CMS workflow entry point based on any of the inputs |
| Inferred owners corresponding to the action items | Identify CMS users who are associated with any one or more of the inferred action items |
| Topics, keywords | Textual description of a topic or keyword as taken directly from inputs into the virtual canvas and/or as discovered from natural language processing of speech-to-text outputs |
| Ideas or themes (involving multiple topics) | Textual description of ideas or themes as taken directly from inputs into the virtual canvas and/or as discovered from natural language processing of speech-to-text outputs |
| Weights of topics, ideas, keywords, each with corresponding relative weights | Numeric values applied to topics, ideas, or keywords |
| Groupings of uploaded objects | Groupings are determined based on interactions of the participants in the virtual canvas session and/or based on |

TABLE 2-continued

| Inferencer outputs | |
| --- | --- |
| Inferencer Outputs | Description |
| | collaboration metrics derived from the CMS (e.g., based on a history of events over content objects of the CMS |

In addition to performing the various types of processing as presented in Table 1 and Table 2 so as to derive meaning from the interactions by and between the participants, the inferencer is capable of CMS control instruction generation 129. Specifically, and as shown, the inferencer is configured to be able to codify instructions that are subsequently carried out by the CMS. This is exemplified by the shown CMS control instructions 131 that are informed by any one or more of content object changes 114, content object metadata changes 116, and/or collaboration group changes 118. Accordingly, particular species of CMS control instructions include (1) a content object change instruction 120, (2) a metadata change instructions 122, and/or (3) a collaboration group change instructions 124. In exemplary embodiments, these CMS control instructions are codified with sufficient specificity (e.g., reference to a particular content object or reference to a particular collaboration group, etc.) such that the instructions may be received by a CMS control layer 103 and passed to the content management system for execution therein.

To illustrate, it might happen that a participant might upload a file from his/her user device, which file had not yet been loaded into the CMS. The file is then loaded into the CMS, and any metadata associated with the newly loaded file is also loaded into the CMS. This is an example where the CMS control instructions would include (1) a content object change instruction 120 (to reflect the existence of the new file), and (2) one or more metadata change instructions 122. In some embodiments, further CMS control instructions are sent to the CMS so as to establish or change constituency of a collaboration group that identifies selected participants. In some embodiments, CMS control instructions are sent to the CMS so as to add a member to, or so as to remove a member from, a collaboration group. In some embodiments, even still further CMS control instructions are sent to the CMS so as to establish ownership of a newly loaded file. In some situations, a participant in the online collaboration session might not be a registered user of the CMS. In such a situation, the CMS might establish a temporary user account for the user who is not a registered user of the CMS. Such a temporary account includes a proxy of a CMS user that permits limited access to only a limited set of content objects (e.g., only those content objects that were shared during the course of the online collaboration session).

The timeframe during which the inferencer operates can include the entire time that the virtual canvas session interactions 126 are occurring. Additionally or alternatively, the timeframe during which the inferencer operates can include a time period after the close of the virtual canvas session. This can be advantageously applied in a computing system. In particular, some of the processing of inputs (e.g., the inputs of Table 1) can be carried out in real-time or near-real-time (e.g., speech to text) during the time progression of the session, whereas other processing can most effectively be carried out after the close of the virtual canvas session. Strictly as one example, it might be that some of the virtual canvas session interactions 126 involve conversations between participants. In such cases, it might be that post processing over the audio recording of the conversations are subjected to representation conversion (e.g., via speech-to-text), language translation (e.g., from one language into another), and/or distillation (e.g., semantic extraction) of the conversation into topics, ideas, action items, etc. In such a case it might be most effective to separate the full audio/video of the session into multiple separate channels, where multiple separate channels correspond to what was said by each participant. In some embodiments, the text version from a speech-to-text representation conversion is presented in the virtual canvas as a speech-to-text annotation or as a speech-to-text bubble. Bubbles can be displayed, and then removed from the display in real time.

Further details regarding general approaches to representation conversion, language translation, and/or distillation of virtual canvas session interactions are described in U.S. Pat. No. 10,867,209, issued on Dec. 15, 2020, which is hereby incorporated by reference in its entirety.

In some situations individual ones of the aforementioned approaches to representation conversion, language translation, and/or distillation of a full range of virtual canvas session interactions can be applied in a sequence or chain, or can be applied in parallel. In some cases, a determination as to when to invoke any particular conversion, language translation, or distillation may be based at least in part on the time latency involved between having an input (e.g., some speech) and getting an answer or output. Accordingly, such a determination can be made in real-time. Moreover, various ones or types of instructions that are executed by the CMS can be generated during the time progression of the session, whereas other types of instructions are generated after the end of a session. One possible time progression scenario from inception to conclusion of an online collaboration session is shown and described as pertains to FIG. 1B.

FIG. 1B exemplifies a time progression scenario from inception to conclusion of an online collaboration session. As an option, one or more variations of time progression 1B00 or any aspect thereof may be implemented in the context of the architecture and functionality of the embodiments described herein and/or in any environment.

As shown, various users (e.g., user $U_1$, user $U_2$, user $U_3$, . . . , user $U_N$) interact with a virtual canvas, for example by talking during the virtual canvas session and/or by uploading a content object into the virtual canvas. In this embodiment, the system synthesizes instructions to be carried out by the CMS during the progression of the virtual canvas session as well as after the end of the virtual canvas session. Each individual participant in the online virtual canvas session (e.g., user $U_1$, user $U_2$, user $U_3$, . . . , user $U_N$) can interact through their respective user devices (e.g., laptops, desktops, phones, tablets or combinations thereof) to cause participant-specific online virtual canvas interactions.

One such participant-specific online virtual canvas interaction is illustrated by the late arrival of user $U_N$. Upon detection of the presence of user UN the system will set about to register the user's device with the CMS. In some circumstances, the user is already a registered user of the CMS and the user's user device is registered accordingly. In other situations, the user is not already a registered user of the CMS, so the user's user device is registered with the content management system as a guest device.

Figure 1C:
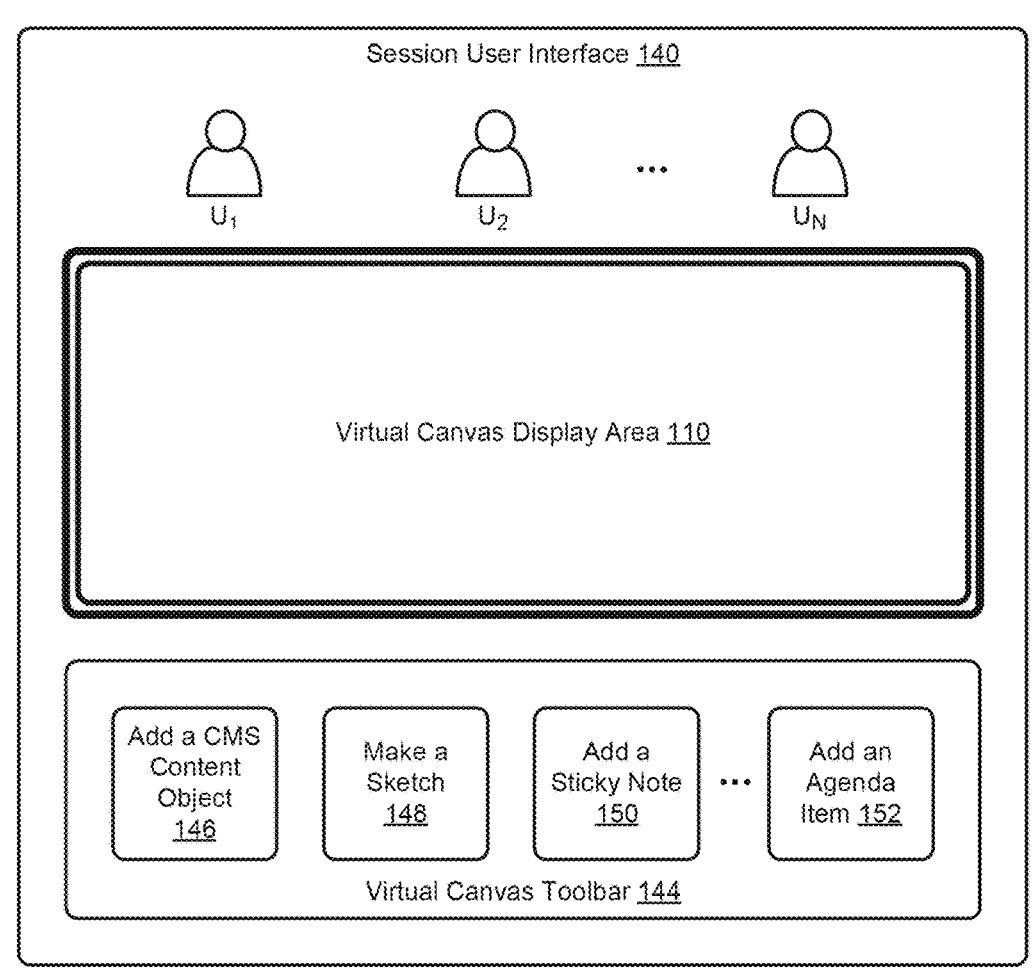
FIG. 1C presents an online virtual canvas user interface showing a variety of interactive tools available to participants during an online collaboration session, according to an embodiment.

One of the participant-specific online virtual canvas interactions shown involves making an annotation. This can be accomplished using one or more tools provided in or with the virtual canvas. FIG. 1C shows and describes interactive tools available to participants during an online collaboration session.

FIG. 1C presents an online virtual canvas user interface showing a variety of interactive tools available to participants during an online collaboration session. As an option, one or more variations of online virtual canvas user interface 1C00 or any aspect thereof may be implemented in the context of the architecture and functionality of the embodiments described herein and/or in any environment.

As shown the online virtual canvas user interface includes a virtual canvas display area 110 that is situated in proximity to a virtual canvas toolbar 144, both of which are displayed as components of a session user interface 140. The session user interface may include images or real-time video, or names or avatars of any one or more of the participants (e.g., $U_1$, $U_2$, $U_3$, . . . , $U_N$) of the session.

In this embodiment, the virtual canvas toolbar is composed of a tool to add a CMS content object 146 (e.g., upload a CMS content object, upload a local file to the virtual canvas for subsequent storage as a content object in the CMS, etc.), a tool to make a sketch 148, a tool to add a sticky note 150, other tools (not shown), and a tool to add an agenda item 152. Any one or more of the participants can avail themselves of any one or more of the shown tools of the virtual canvas toolbar so as to participate in the online collaboration session.

Contemporaneously with the collaboration (e.g., during the time that the canvas user interface is active), various virtual canvas processing can be carried out so as to infer what actions should be taken by the CMS. Strictly as one example, it might happen that a user avails of the "add an object" tool to add a file that is, for example, uploaded from the user's computing device. By observing the user's actions or, more specifically, by observing the operation of the aforementioned "add an object" tool, quite a lot about the interaction can be inferred. In exemplary cases, the inferences can be codified as CMS control instructions. There are innumerable possibilities for the inferences and corresponding CMS control instruction types. A selection of CMS instruction types are shown and discussed as pertains to FIG. 1D.

FIG. 1D presents a sampling of CMS control instruction types that can be raised in an online collaboration session and carried out by a content management system. As an option, one or more variations of CMS control instruction types or any aspect thereof may be implemented in the context of the architecture and functionality of the embodiments described herein and/or in any environment.

The figure is being presented to illustrate the wide range of CMS instruction types. Moreover, the figure is being presented to illustrate the domino effect where one particular action taken by a user (e.g., using a virtual canvas toolbar tool) can cause a CMS instruction to be generated, the execution of which instruction by the CMS will cause specific one or more CMS operations to be invoked, which in turn will raise triggers, which foregoing triggers or operations result in inputs being formatted for input to an inferencer (e.g., inferencer 112 of FIG. 1A).

Strictly as an illustrative example, an upload action (e.g., by user operation of the "add an object" tool of the virtual canvas toolbar tool) may result in codification of a CMS instruction that invokes an operation of the CMS to add the uploaded object as new content object into the CMS. It might happen that concurrent with the addition of the new content object in the CMS, metadata corresponding to the new content object is codified and associated with the new content object. Further, the event corresponding to the initial action by the user and any domino effect events or actions that follow the event corresponding to the initial action by the user are captured in an event history repository as virtual canvas events or session events.

As shown in FIG. 1D, the initial and/or domino effect events might include capturing and/or calculation of participant engagement metrics, dynamic constitution of a team (e.g., with members drawn from the participants and/or any users of the CMS), triggering of a CMS workflow at some particular workflow entry point, triggering completion of a workflow stage gate, emitting task assignments, etc.

As can now be understood, any sort of observable event that occurs during an online collaboration session can cause one or more CMS instructions to be generated, which in turn causes CMS operations to be initiated. As such, a virtual canvas session management module can be deeply integrated with any/all of the facilities of a content management system. One example technique for generating CMS control instructions is shown and described as pertains to FIG. 2.

Figure 2:
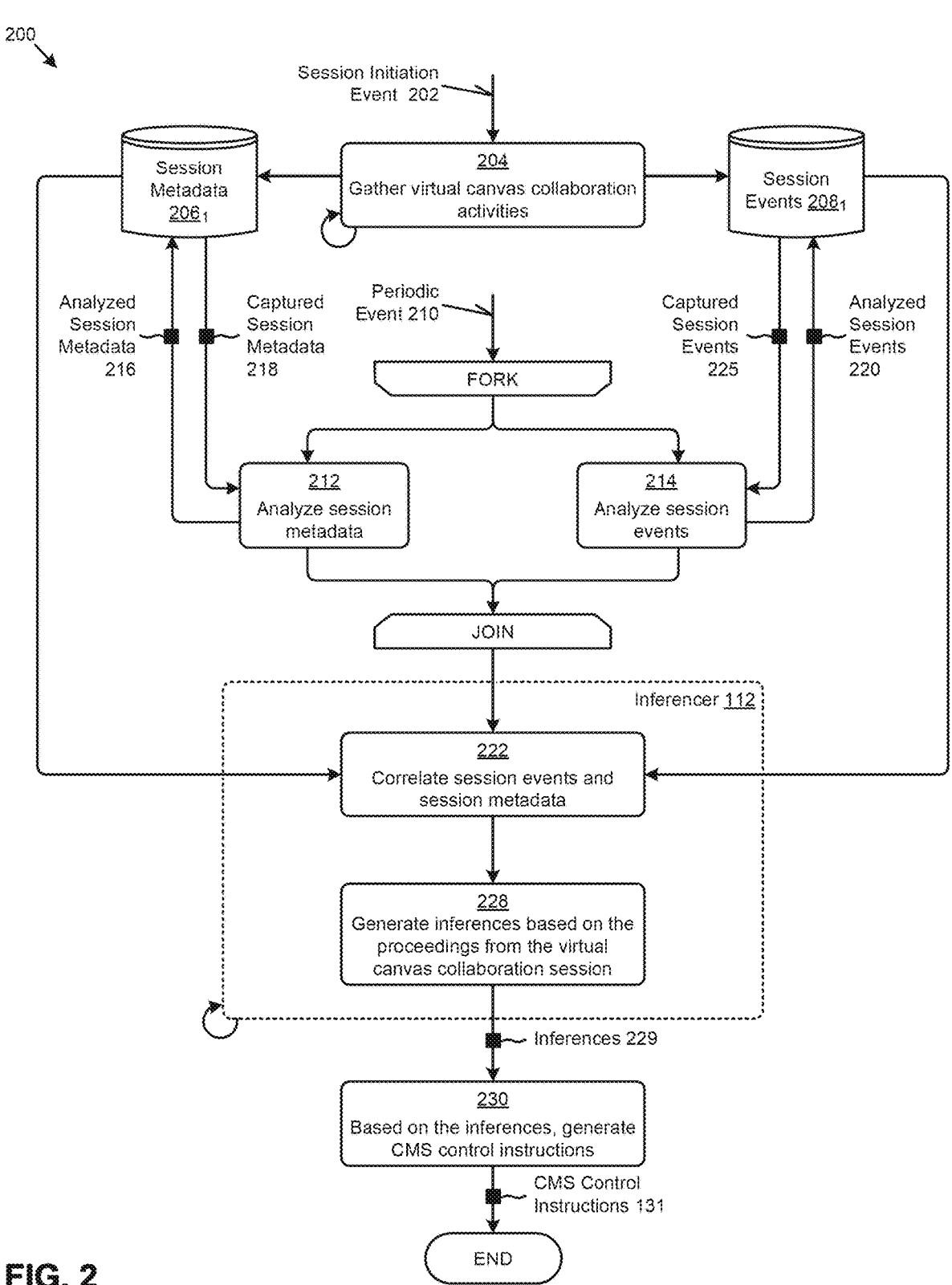
FIG. 2 presents a CMS control instruction generation technique as used in online meeting systems that raise CMS control instructions to be carried out by a content management system, according to an embodiment.

FIG. 2 presents a CMS control instruction generation technique as used in online meeting systems that raise CMS control instructions to be carried out by a content management system. As an option, one or more variations of CMS control instruction generation technique 200 or any aspect thereof may be implemented in the context of the architecture and functionality of the embodiments described herein and/or in any environment.

The figure is being presented to illustrate one possible implementation of a system that generates CMS control instructions based on analysis of events (and corresponding metadata) that occur during an online collaboration session. This particular implementation can make inferences and generate CMS control instructions therefrom. The inferencing and/or the generation of CMS control instructions can take place during the time that the online collaboration session is active and/or after the online collaboration session has been closed.

The shown flow commences upon session initiation event 202, after which event a long-running operation (e.g., step 204) continuously captures virtual canvas collaboration activities and stores the event and any corresponding metadata into persistent repositories (e.g., into session events $208_1$ and into session metadata $206_1$, respectively). Such gathering of virtual canvas collaboration activities (e.g., in the form of session events and session metadata) can continue for at least as long as the session remains active. During or after such activity gathering, and with any periodicity, upon some periodic event, 210 launches (1) real-time analysis of then-current captured session metadata 218 (step 212) and (2) real-time analysis of then-current captured session events 225 (step 214). Interim results of such analyzed session metadata may be stored back into the session metadata repository as analyzed session metadata 216. Interim results of such analyzed session events may be stored back into the session event repository as analyzed session events 220.

Strictly as one example, consider an online collaboration session where a user uploads a CMS content object for display in/on the virtual canvas display area. Further consider that a different user might post a comment into/onto the virtual canvas display area on top of, or in proximity to, the content object being displayed in/on the virtual canvas display area. In this situation, the metadata comprising the comment itself or a reference to the comment itself can be implied to be associated with the uploaded content object. Such an implication, possibly with an association between the comment and aspects of the event of the posting of the event could be stored (e.g., in session metadata $206_1$) as analyzed session metadata 216. Additionally or alternatively, an implication could be stored (e.g., as session events $208_1$) as analyzed session events 220.

At some point in time, the session metadata repository and the session event repository are deemed to be in a condition for processing by inferencer 112. The foregoing point in time might be during the time that the online collaboration session is active and/or after the online collaboration session has been closed. Regardless of the specific point in time when the inferencer is invoked, the inferencer may correlate session events with session metadata (step 222). Such correlations, possibly including application of rules and/or heuristics, serve to generate inferences 229 (step 228). Additionally, or alternatively, the inferencer can correlate session events with session metadata (step 222) so as to emit inferences (step 228). The steps within the inferencer 112 can be carried out repeatedly in a loop or other iterative control structure.

At any moment in time, possibly in real time during correlation, and/or possibly when all of the session metadata and/or all of the session events have been processed by the inferencer, CMS control instructions 131 are generated (step 230).

The operations and/or data storage of FIG. 2 can be implemented by any computing device in any environment. Strictly as an illustrative example, FIG. 3 depicts a client-server implementation where various computing devices are in communication with each other over the Internet.

Figure 3:
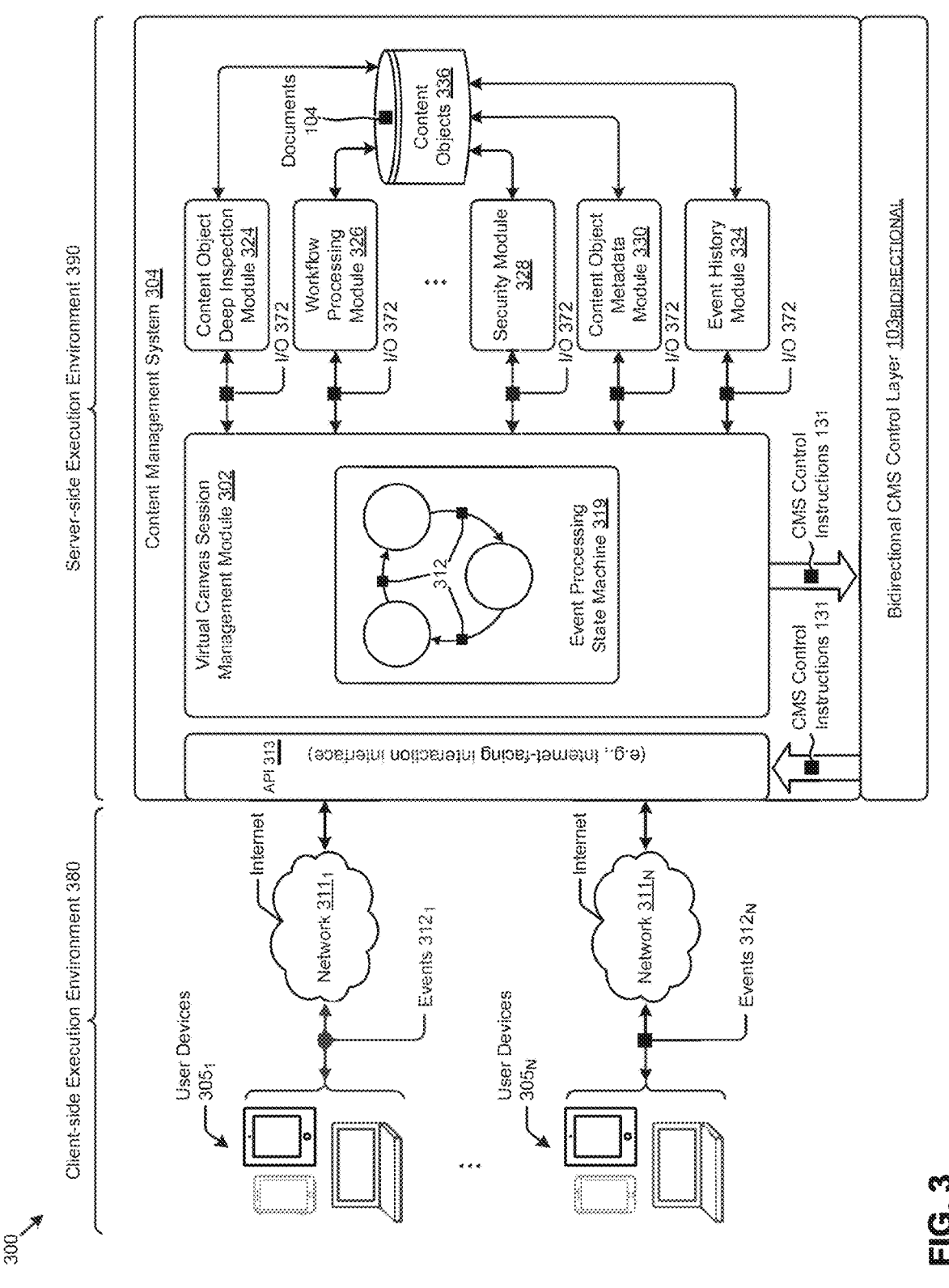
FIG. 3 depicts an example client-server implementation of a virtual canvas system that causes CMS control instructions to be carried out by a content management system, according to an embodiment.

FIG. 3 depicts an example client-server implementation of a virtual canvas system that causes CMS control instructions to be carried out by a content management system. As an option, one or more variations of client-server implementation 300 or any aspect thereof may be implemented in the context of the architecture and functionality of the embodiments described herein and/or in any environment.

As shown, computing devices (e.g., user devices $305_1$, . . . , user devices $305_N$) are situated in client-side execution environment 380. Such computing devices communicate over the Internet (e.g., over network $311_1$, . . . , over network $311_N$) via an API 313 integrated with the shown content management system 304 that is situated in server-side execution environment 390. The shown content management system 304 includes a virtual canvas session management module 302 which is able to ingress and egress data from many CMS modules (e.g., content object deep inspection module 324, workflow processing module 326, security module 328, content object metadata module 330, and event history module 334). Any or all of the aforementioned CMS modules can access (e.g., for reading, writing, execution, and deletion) content objects 336. Each of the aforementioned modules can be dedicated to a particular set of functions, some examples of such functions are discussed infra.

As used herein, "content object deep inspection" refers to analysis of human-readable intelligence by considering the meaning of human-readable words within a collaboration object.

The virtual canvas session management module 302 is configured to be able to process events 312 (e.g., within an event processing state machine 319), which events 312 may originate from user devices (e.g., events $312_1$, . . . , events $312_N$) due to user interactions in a virtual canvas session, or which events may originate or be derived from any one or more of the foregoing CMS modules. In some cases, and as shown, events, possibly with corresponding event metadata, are delivered to one or more CMS modules. The receiving CMS modules may respond by processing the event or events and raising a different event as an output. In some cases, events from multiple CMS modules are received asynchronously by the event processing state machine in a manner such that successive events received at different times by the event processing state machine may cause the underlying state machine to advance to a next state. In turn, entry into a next state may raise yet another event, and so on.

Entry or exit from any state of the event processing state machine may cause emission of one or more CMS control instructions 131, which instructions can be processed by or through the shown bidirectional CMS control layer $103_{BIDI-RECTIONAL}$. As shown, the bidirectional CMS control layer is configured to be able to receive CMS control instructions from the virtual canvas session management module and post such instructions to API 313. In this manner the CMS can be controlled by the virtual canvas session management module. In this particular embodiment, the virtual canvas session management module is situated within the logical bounds of the CMS, however the virtual canvas session management module could be situated outside of the logical bounds of the CMS.

Now, referring to the shown I/O 372 that is depicted as going out of and into each of the modules, each of the shown modules have particular specific functions within the CMS. Accordingly, the shown I/O that is depicted going out of and into each module is specific to the processing that takes place to accomplish the particular specific functions. To further explain, consider that the shown content object deep inspection module 324 is able to read and possibly manipulate the actual contents (e.g., the stored bits) of a content object. Accordingly if/when content object deep inspection module detects the presence of personally-identifiable information (PII) in the actual contents (e.g., the stored bits) of a content object, the virtual canvas session management module 302, possibly in cooperation with security module 328, might redact that PII before displaying it to the participants. In some cases, rather than redacting the PII or other sensitive information, the PII or sensitive information is rendered in only those the virtual canvas display areas that correspond to the user devices of CMS users that do possess sufficient privileges to be able to view such PII or other sensitive information.

As used herein, the term to "render" or "rendering" refers to converting a first set of electronic signals or data into a second set of electronic signals or data that is transduced by a user device in a manner that a user of the user device can hear and/or see a representation of first set of electronic signals or data.

In some situations, content object deep inspection module 324 is able to interpret the contents of a content object such that collaboration-related features or passages can be isolated. In some cases, the contents of a content object is sufficiently structured such that details—such as schedules, action items, workflow stage gate assessments, workflow triggers, task interrelationships (e.g., task dependencies)—can be used in downstream processing.

Continuing with further illustrative examples, content object metadata module 330 might detect certain characteristics in common between various content objects (e.g., based on the metadata of the various content objects) and determine that certain of those various content objects should be grouped together (e.g., in a grouping of video files, or a grouping of legal documents, etc.).

Still further continuing with illustrative examples, event history module 334 might be configured to assess how engaged a particular CMS user has been in the past, and then further assess whether or not that level of engagement is being met in the current online collaboration session.

Returning again to discussion of content object deep inspection module 324, it can happen that such a module is configured to accept a plug-in, which plug-in might in turn be configured to perform analysis of the contents (e.g., the actual bits) of a content object. Strictly as one example, consider a group of content objects, all of which are X-ray images. Now, further consider that the third party plug-in is configured to be able to present an X-ray at many selectable resolutions. Accordingly, the third party plug-in might be queried to request conversion of the X-ray from one resolution into a different resolution that corresponds to screen capabilities of the user device of a participant.

Inputs into any one more of the aforementioned modules (e.g., inputs depicted as I/O 372) can include session profile data, which session profile data serves to inform the modules with enough specificity such that the module is given a then-current context of the session. One way to generate a session profile is shown and described as pertains to FIG. 4.

FIG. 4 presents an online collaboration session profile generation technique as used in systems that raise CMS control instructions to be carried out by a content management system. As an option, one or more variations of online collaboration session profile generation technique 400 or any aspect thereof may be implemented in the context of the architecture and functionality of the embodiments described herein and/or in any environment.

The figure is being presented to illustrate how ongoing events that take place during an online collaboration session can be analyzed so as to generate a session profile. Data within a session profile can in turn be used (e.g., by the inferencer and/or any specialized modules) for CMS control instructions generation. The implementation shown is merely an example, and other data and/or data flows can be devised to implement session profile generation and enrichment.

Referring again to FIG. 2, inferencer 112 includes a step (step 222) that correlates session events with session metadata. From such correlations, inferences may be generated. Now, strictly as an illustration, it might happen that user $U_1$ uploads a content object onto the virtual canvas. In this case, associated with the event of the upload are various session metadata $206_2$, which data indicates that (1) it was user $U_1$ who caused the upload, (2) it was the content object known as "FileA", and (3) that the upload was caused at some particular time. Other metadata can be captured and associated with the event as well. More specifically, as time progresses, it might be observed that the upload spawned a participant-to-participant discussion that results in a recording of audio that can then be used in a speech-to-text conversion. Still more specifically, as time progresses, it might be observed that three of the participants (e.g., participants other than the user who caused the upload) interacted with the uploaded content object. That fact can be captured as metadata that is associated with the content object upload, and the association (e.g., interaction by the three participants) can be used to begin formulating team constituency.

As time progresses, myriad types of occurrences (e.g., events) that may emerge during the progression of time while the session is active. Similarly there are myriad bits of information (e.g., metadata) that characterizes any given aspect of events that occur during a session. Accordingly, in a continuous manner (e.g., in an interrupt-driven manner), or periodically (e.g., based on occurrence of a periodic event 210), step 406 serves to (1) access session events (e.g., from session events $208_2$), (2) access associated session event attributes (e.g., also from session events $208_2$), and (3) form a relationship between any session metadata and session events. Such operations may serve to dynamically build a high-dimensional data structure as time progresses. At any moment in time, such a high-dimensional data structure 430 can be provided to step 408, where any of the then-current session data (e.g., information captured in the high-dimensional data structure) is analyzed to identify content objects that are correlated to aspects of the then-current session data.

During the operation of step 408, a repository for content object data 224 is accessed. Such a repository for content object data 224 may include content objects themselves (e.g., including all of the stored bits that constitute the content object) and/or, such a repository for content object data 224 may include metadata that is associated with any one or more content objects. As such, the carrying out of the operations underlying step 408 generates additional rows, columns, and/or other dimensions that provide for easy lookups into the high-dimensional data structure 430. More particularly, such a high-dimensional data structure can be accessed by any content object identifier, any metadata item, and value, and event, etc.

Step 422 serves to analyze contents of the high-dimensional data structure, specifically the correlated to content object, such that the analysis results in a session profile for the current session, which session profile is stored in a repository for session profile data 412, which repository is configured to be able to store session profiles for any number of sessions. In some cases, a first session profile is linked to a second session profile based upon some metadata value. For example, a first session profile might be linked to a second session profile on the basis that both sessions had the same facilitator.

Since substantially all of the virtual canvas user interactions are captured in the high-dimensional data structure, various operations of the captured virtual canvas user interactions can be performed at any moment in time (e.g., during the online collaboration session or after the online collaboration session). Strictly as on example embodiment, the analysis of step 422 can include a series of operations as shown in Table 3.

TABLE 3

| Inferencer operations | |
| --- | --- |
| Inferencer Operation Handle | Example Processing |
| Classification and characterization of a virtual canvas user interaction | Determine if the virtual canvas user interaction represents an edit to a particular CMS content object |
| | Determine if the virtual canvas user interaction is a highlight or a comment to a particular CMS content object |
| | Determine if the virtual canvas user interaction forms a relationship between a first CMS content object and a second CMS content object |
| | Determine if the virtual canvas user interaction implies a relationship between a first participant and a second participant |
| | Determine if the virtual canvas user interaction is unrelated to any CMS content object |
| Filter-out | Eliminate from further consideration any virtual canvas user interactions that are unrelated to any CMS command or content object |
| Select-in | Further classify the virtual canvas user interactions to determine if the virtual canvas user interaction refers to a single CMS command or multiple CMS commands |
| Breakdown and format into a canonical representation | Breakdown all virtual canvas user interactions that imply multiple CMS commands into a sequence of single CMS commands |
| | Format all single CMS commands into a canonical representation |
| Translate the canonical representations into a CMS command | Lookup a canonical representation and, if found, then proceed, but if not found, then eliminate from further consideration |
| | Match the found canonical representation into a CMS command |

To exemplify, and in accordance with the inferencer operations of Table 3, consider a situation where the inferencer deems a particular virtual canvas user interaction to apply to a particular content object such as when a participant highlights a particular displayed portion of a content object. In this situation, the inferencer can (1) correctly infer the relationship between the highlighting and the particular displayed portion of a content object, and (2) the inferencer can codify a CMS command to add the highlighting of that portion of the content object as metadata of the content object. As another example, and strictly for purposes of illustration, consider the same or similar situation where a particular participant interacts with a particular content object such as when the participant hovers his/her mouse/cursor over a particular displayed portion of a content object. In this situation, the inferencer can not only infer the relationship between the acts of mouse hovering and the particular displayed portion of a content object, but the inferencer can codify a CMS command to add the user to one or more collaboration groups covering the content object.

The foregoing may apply not only to content object highlights, but also to content object edits, content object comments, content object annotations, etc.

To further explain, any of the participant-specific online virtual canvas interactions can be represented in a machine-readable canonical representation of the interaction, and as such, a CMS command can be looked up by accessing a table or other data structure that can be indexed by the canonical representation of a particular virtual canvas interaction. A content addressable memory can be used to facilitate fast matching of a canonical representation of a particular virtual canvas interaction from an array of many canonical representations.

In addition to the foregoing, step 422 serves to correlate any bits of data in the high-dimensional data structure 430 with any other bits in the high-dimensional data structure. In doing so, certain aspects of a session can be correlated with other aspects of a session so as to reach implications or conclusions about the session, and such conclusions can be codified into a session profile 426. For example, a relationship between a particular content object and events on that content object that were raised by (for example) a first participant and a second participant might cause formation of an implied team 414 composed of (1) the user who posted the particular content object, (2) the first participant, and (3) the second participant. Additionally or alternatively, object groupings 420 can be formed based on relationships between a first content object and a second content object. Further, object groupings 420 can be formed based on CMS collaboration groups that include the first participant and the second participant. Still further, groups can be automatically formed on the basis of participant membership in a particular department and/or on the basis of some action item assignment. Even still further, object groupings 420 can be formed based on the temporal proximity of events raised by the first participant, the second participant, and so on. In some embodiments object groupings 420 can be formed based on a file type (e.g., video files are grouped together). In some embodiments object groupings 420 are displayed in the virtual canvas. In some embodiments object groupings 420 are facilitated by referencing a third party tool or application. In some embodiments object groupings 420 are facilitated by referencing a third party plug-in.

Further details regarding general approaches to accessing third party applications from a CMS are described in U.S. Publication No. 2020-0068026, which is hereby incorporated by reference in its entirety.

In still other situations, analysis of the high-dimensional data structure might correlate events so as to calculate engagement metrics 418, which engagement metrics include values that are empirically measured and which, directly or indirectly, indicate the degree to which a particular user interacts with another user, and or the degree that a particular user is interested in a particular content object or sketch or other constituent of the virtual canvas.

In the embodiments comprehended by this disclosure as a whole, there are many techniques for measuring engagement. One possible technique for measuring engagement is shown and described as pertains to FIG. 5.

Figure 5:
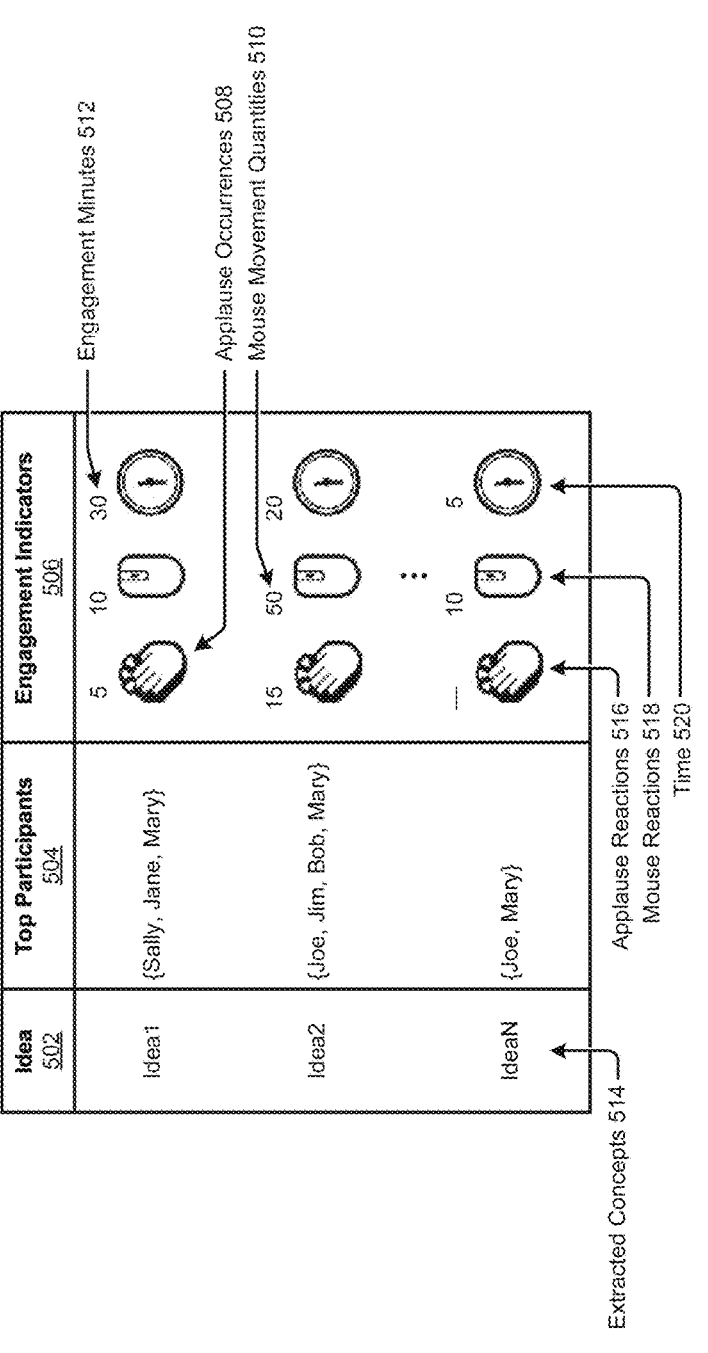
FIG. 5 depicts an engagement measurement technique as used in systems that raise CMS control instructions to be carried out by a content management system, according to an embodiment.

FIG. 5 depicts an engagement measurement technique as used in systems that raise CMS control instructions to be carried out by a content management system. As an option, one or more variations of engagement measurement technique 500 or any aspect thereof may be implemented in the context of the architecture and functionality of the embodiments described herein and/or in any environment.

The figure is being presented to illustrate how interaction events that occur in real time during a session can be used to determine the most active participants, and how a series of interaction events, possibly raised by any of the participants in the virtual canvas session, can be used to identify and extract concepts or ideas that are discussed during the virtual canvas session.

The aforementioned interaction events can be discrete single events (e.g., individual occurrences of applause reactions 516) or compound events that are measured and collected over a time period (e.g. mouse reactions 518). Various quantitative engagement measurements can be taken (e.g., in real-time, during the progression of the virtual canvas session) and codified as engagement indicators 506. For example, an engagement indicator can derive from the number of occurrences of applause reactions (e.g., applause occurrences 508). Additionally or alternatively, an engagement indicator can derive from the nature (e.g., mouse movement quantities 510 and/or mouse movement types) and duration of mouse reactions (e.g., engagement minutes 512) or other pointing device reactions (e.g., dwell minutes, etc.).

Still further, a strong engagement indicator might include the semantics of "how long the user's mouse is hovering over a particular portion (e.g., content object display) of the virtual canvas" (e.g., time 520). As another example, a relatively strong engagement indicator might be codified as a high quantitative value (e.g., 30) that refers to engagement minutes 512, whereas a relatively weak engagement indicator might be codified as a low quantitative value (e.g., 5) that refers to fewer engagement minutes. The foregoing are merely illustrative examples. Participant engagement can be gauged by myriad types if interaction. Again, merely as examples, an interaction level of a particular participant might be gauged, at least in part, by frequency of posts into the virtual canvas, and/or by frequency or volume of chat participation, and/or by frequency or length of talking. These and other inputs that are used to gauge the degree of interaction by a particular participant can be used singly or in aggregate. In some cases different inputs are weighted by a numeric multiplier.

In some situations, any one or more of the engagement indicators can be correlated with participants. One or more of such participants who have strong engagement indicators can be deemed to be interested parties with respect to the ideas 502 being collaborated over at the time. As such, and as shown, ideas (e.g. ideal, idea2, . . . , ideaN) can be deemed to be of interest to the top participants 504 who have high engagement indicators. In this case, participants {Sally, Jane, and Mary} are deemed to be interested in "Idea1", whereas {Joe, Jim, Bob, and Mary} are deemed to be interested in "Idea2".

Of course the notion of "an idea" can be any idea, even the idea that {Sally, Jane, and Mary} is a reasonable constituency for the topics or concepts being discussed in the online collaboration session.

There are many features of a CMS that facilitates extracting an idea from a discussion stream. For example, even though an online meeting system might support a conversation stream (i.e., where participants make entries during the course of the meeting) and/or even though an online meeting system might support a "chat" window, it turns out that the entries in a conversation stream often fail to fairly capture the important aspects of the meeting such as topics covered, action items taken, due dates, etc. Moreover, the utility of the various entries in a conversation stream or chat stream depend almost completely on the discipline of the participants and/or scribes or administrators to make entries that document a record of the participants, along with various key events that have transpired during the course of the online meeting session.

What is needed is a way to automatically capture important aspects of a virtual canvas sharing. Unfortunately, legacy techniques are left with the impossible task of isolating an idea or concept from some arbitrary sampling of input, and/or from that arbitrary sampling of inputs that resolve to a 'best guess' of what the idea or concept is or might be. A better way is to have at least a seed of an idea or concept, which seed of the idea can inform a semantic extraction natural language processing model. In turn, given some high quality inputs into the semantic extraction natural language processing model, the model will do a remarkably good job at isolating the idea or concept. Fortunately, there are many high quality inputs that can be garnered from a content management system. More particularly the name of a content object (e.g., a filename) might provide some of the aforementioned high quality inputs. Moreover, a sampling of characteristics of workflows that input or output the content object corresponding to the file's filename can be used to isolate the idea or concept. For example, consider an online collaboration session where a content object with file name "January Budget" was uploaded into the virtual canvas. Further consider that a workflow, say "Budget Ratification", had recently input that content object with file name "January Budget". Now further consider that the "Budget Ratification" workflow is waiting at a stage-gate for approval. A reasonable inference from all this is that the concept or topic of discussion was to secure "Budget Ratification" for the "January Budget".

In some cases, engagement indicators including the deemed top participants 504, and extracted concepts 514 can be used singly or in combination when generating CMS control instructions. Various mechanisms for managing a virtual canvas session, including generation of CMS control instructions in response to participant interactions are shown and described as pertains to FIG. 6A, FIG. 6B, and FIG. 6C.

Figure 6A:
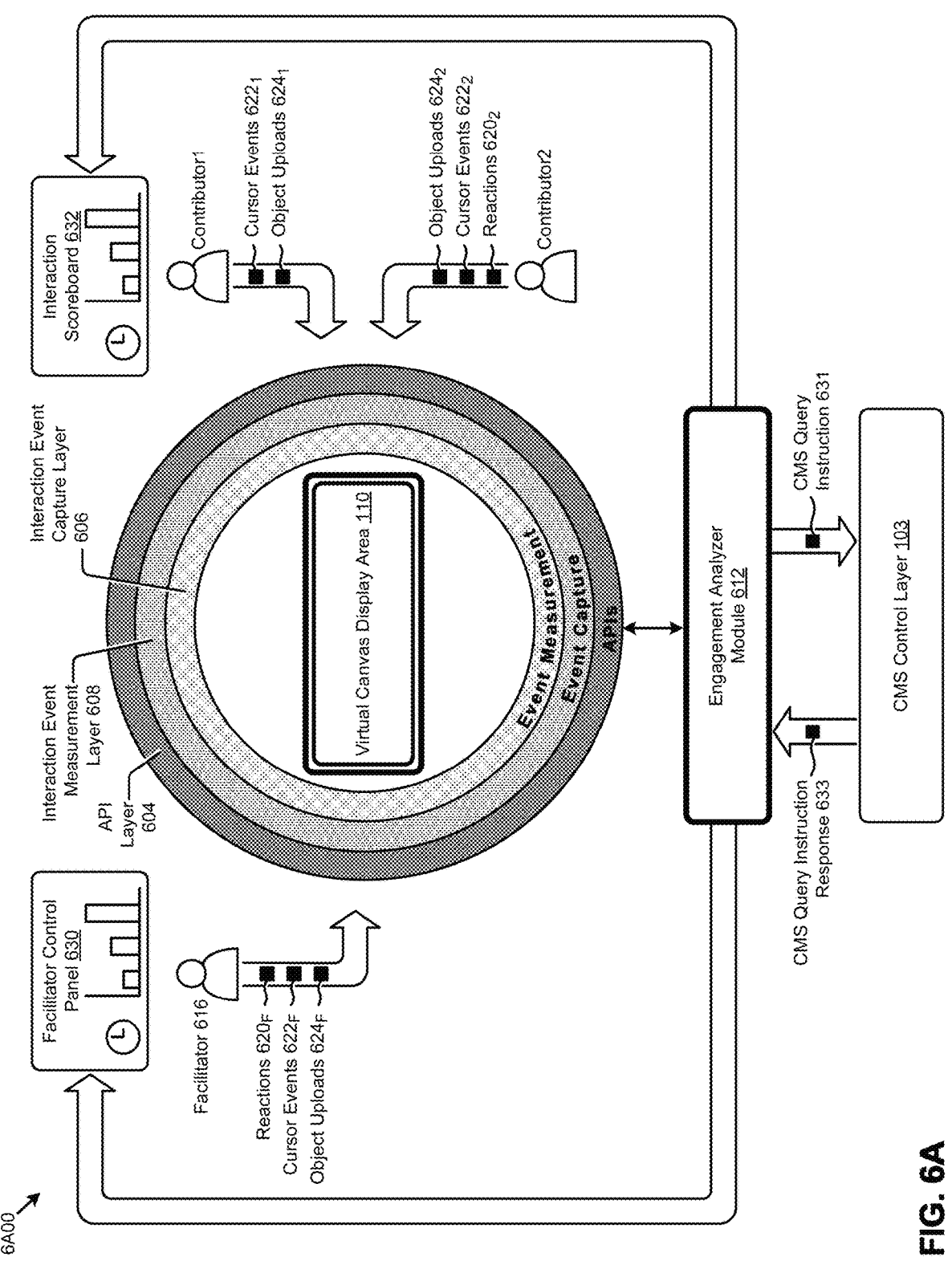
FIG. 6A depicts an example virtual canvas ecosystem in which a content management system responds to CMS query instructions, according to an embodiment.

FIG. 6A depicts an example virtual canvas ecosystem in which a content management system responds to CMS query instructions. As an option, one or more variations of virtual canvas ecosystem 6A00 or any aspect thereof may be implemented in the context of the architecture and functionality of the embodiments described herein and/or in any environment.

The figure is being presented to illustrate how events that take place over a virtual canvas can be analyzed so as to generate queries to the content management system. Events that take place over a virtual canvas are analyzed in real time, and responses from the content management system are delivered to the moderator and/or other participants in real time as well. As shown, the moderator (e.g., facilitator 616) has access to a facilitator control panel 630, and the other participants (e.g., contributor1, contributor2, etc.) have access to participant-specific instances of an interaction scoreboard 632. By looking at the facilitator control panel 630, the facilitator can know at a glance which participants are fully engaged and which participants are engaged less so. Similarly, by looking at their own instance of a participant-specific interaction scoreboard 632, the participants can know at a glance how their engagement is being scored. For the facilitator, having engagement information presented in a facilitator control panel gives the facilitator a chance to enhance overall contributor engagement. For the other participants, having engagement information presented in a interaction scoreboard gives the participants motivation to improve their individual engagement.

To explain more fully, in most settings, a collaboration session has a host or facilitator who in turn invites a plurality of participants to join the collaboration session. The host (e.g., often a leader or teacher) sometimes acts as a moderator/facilitator so as to keep the collaboration flowing and/or to invoke motivational techniques (e.g., praise). One such motivational technique is merely to encourage participants to share their reactions online.

To foster this sort of participant engagement, some electronic collaboration systems offer built-in "reaction" icons that are presented in one or more screen devices of the electronic collaboration session. The host can see which participants are posting which "reaction" icons, and thereby form a real-time, ever-changing assessment as to if, and to what extent, the participants are engaged. Some electronic collaboration systems offer visual cues that highlight participant engagement. Some such aids include, for example, advancing a participants avatar onto a first portion of a gallery view, and/or by highlighting one or more avatars corresponding to whomever it is that is engaging in the discourse (e.g., via posting a chat message, or via speaking, etc.).

Using such techniques to form an ever-changing assessment of whom from among the participants is engaged is often helpful to the facilitator. However, the foregoing techniques treat all engagements equally—regardless of the qualifications of the participant. Unfortunately this fosters a sort of electronic rabble, where the "loudest voice" (e.g., the participant speaking the most often, or posting reactions the most often) or the "most prolific participant" (e.g., the participant who is generating many chat postings) has the unwanted consequence of drowning out reactions or other engagement actions from other participants. Worse, the facilitator might not know every participant and, as such, might not be able to quickly associate the underlying credentials of an engaging participant with the content of the engagement itself. For example, the facilitator might not know whether a particular participant has the background and/or authority to speak on a particular topic. This lack of information risks perpetuation of unwanted rabble. What is desired is a way for the facilitator of an electronic collaboration session to know, in real time, something more about a particular participant. Fortunately, content management systems often track a wealth of information about its users, and as such it is possible (e.g., using the techniques disclosed herein) to provide, in real time, the facilitator with relevant information about a particular participant and/or his or her interests. To do so demands that the virtual canvas session be integrated with a content management system, at least to the extent that the virtual canvas session can query a content management system for information that would permit the facilitator to be presented with relevant information about a particular participant and/or his or her interests.

The shown virtual canvas ecosystem 6A00 implements an engagement analyzer module 612 that integrates a virtual canvas session with a content management system. Specifically, the engagement analyzer module is configured to make API calls (e.g., via API layer 604 and/or via interaction event measurement layer 608, and/or via interaction event capture layer 606) so as to retrieve information about interaction events that have taken place over the virtual canvas display area 110. Given the wealth of information pertaining to interaction events from or by the facilitator (e.g., reactions 620F, cursor events 622F, object uploads 624F, etc.) and/or interaction events from or by a first contributor (e.g., cursor events 6221, object uploads 6241, etc.) and/or interaction events from or by a second contributor (e.g., object uploads 6242, cursor events 6222, reactions 6202, etc.), the engagement module is able to turn a stream of events into a content management system query.

Strictly as one example, consider the scenario where contributor1 and contributor2 are on the same team. Further consider the same scenario where contributor1 is observed to be providing nearly 100% of the interaction events during the session and contributor2 is observed to be providing less than 1% of interaction events during the session. If, during the session, the facilitator was presented with the information that contributor1 and contributor2 are on the same team, in spite of little or no interaction from contributor2, then the facilitator might attempt to remediate the imbalance. In order to present the facilitator with the fact that contributor1 and contributor2 are on the same team, the content management system would need to be consulted. In this specific case, the facility to consult with the content management system is provided by the shown CMS control layer 103. More specifically, one or more operational elements that constitute the engagement analyzer module 612 can be configured to issue a CMS query instruction 631 to the CMS control layer. The CMS control layer in turn can be configured to respond to a CMS query instruction 631 with a CMS query instruction response 633, where the CMS query instruction response includes the sought-after information from the CMS. As one example, assume that "Pat" is a participant in a current online collaboration session. Further assume that the CMS can be queried (e.g., using a CMS query instruction 631) so as to actually get hard data that "Pat" is a very active user over content objects of the CMS. In this situation, the facilitator 616 can be notified that "Pat" is predicted to be a strong member of a team.

Referring again to the scenario where the facilitator needs to be informed that contributor1 and contributor2 are assigned to the same team, the foregoing mechanism works by having the engagement analyzer participate in observing some imbalance or other feature of the overall interactions, and then having the engagement analyzer issue a query to the CMS, the results of which query serve to enrich the understanding of the facilitator.

The foregoing example of an imbalance between team members is merely an illustrative example. There are many real-time metrics and summary information pertaining to participant interactions that can be observed and analyzed to the extent that, upon adding information derived from the CMS, the understanding of the facilitator is greatly enhanced.

Figure 6B:
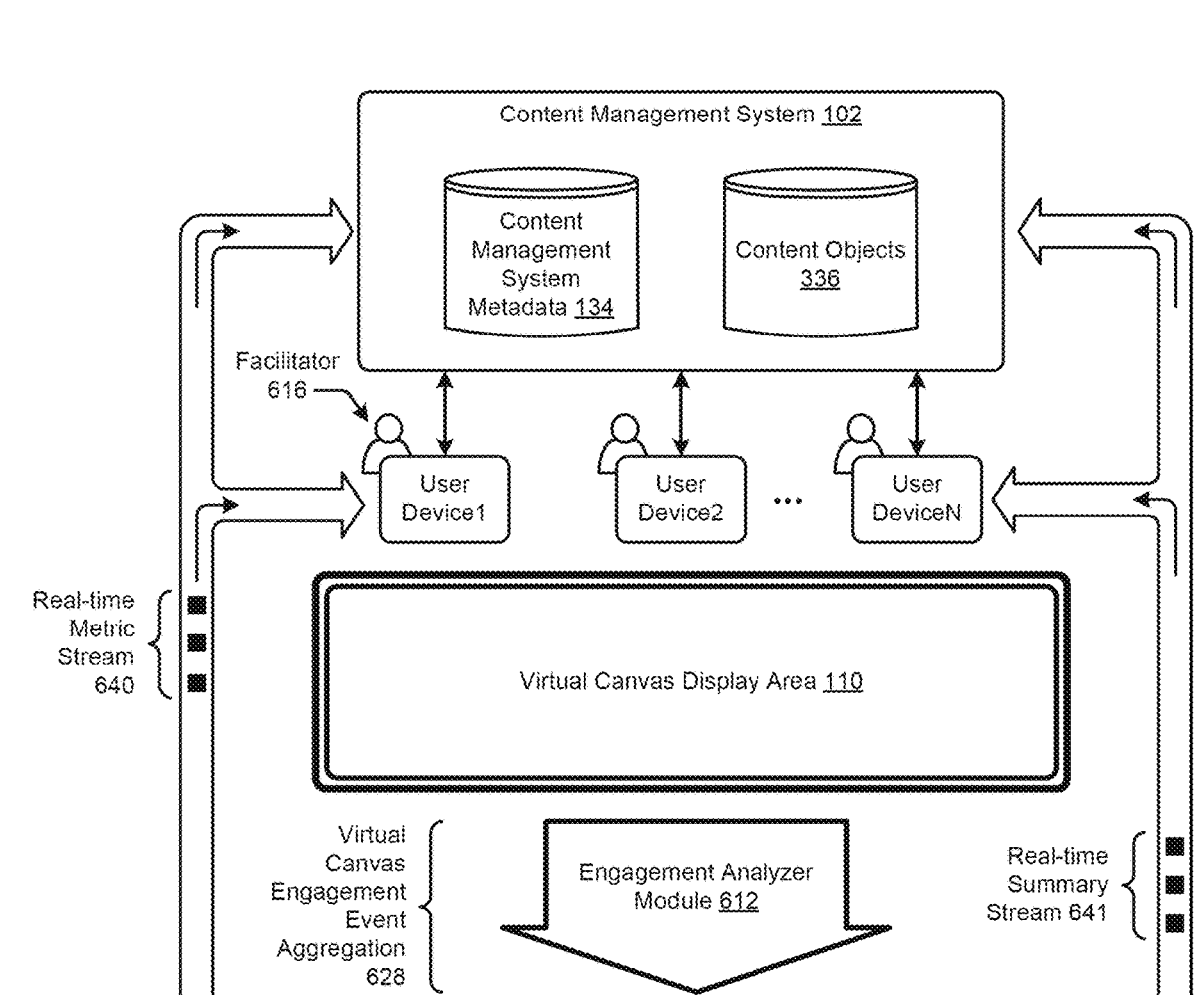
FIG. 6B depicts an example virtual canvas ecosystem that is configured to provide a stream of real-time metrics to a content management system, according to an embodiment.

Some examples of such real-time metrics, and summary information is shown and described as pertains to FIG. 6B.

FIG. 6B depicts an example virtual canvas ecosystem that is configured to provide a stream of real-time metrics to a content management system. As an option, one or more variations of virtual canvas ecosystem 6B00 or any aspect thereof may be implemented in the context of the architecture and functionality of the embodiments described herein and/or in any environment.

The foregoing FIG. 6A describes an engagement analyzer module 612 that is able to query/retrieve information about events that take place over a virtual canvas. The retrieved information about events may refer to individual events, or the retrieved information about events may refer to sequences or patterns of events. In some embodiments, the virtual canvas display area, and/or the API layer 604 of FIG.

6A, and/or the interaction event measurement layer 608 of FIG. 6A, and/or the interaction event capture layer 606 of FIG. 6A is distributed across many user devices. In order to do certain interaction event analysis, it is convenient to have some mechanism for aggregating events from many different user devices. One possible implementation of such aggregation is to provide a facility for virtual canvas engagement event aggregation 628 in or alongside of engagement analyzer module 612. Aggregation of events facilitate calculation of real-time metrics 618 and/or session summary metrics 619. Strictly as examples, real-time metrics might include a time-wise sampling of the number of participants who are engaged in the session. The number of participants who are engaged in the session can be expressed as the percentage 642 of the total number of participants who are engaged. Alternatively, a real-time metric stream (e.g., a continuously-updated real-time metric stream) contains the data needed for displaying the most active participants (e.g., "Top(N) 644"). A threshold can be used in conjunction with a baseline calibration value 646. The foregoing stream of real-time metrics (e.g., the shown real-time metric stream 640) can be provided to any number of user devices. In some cases, a stream of real-time metrics and/or results of analysis therefrom is displayed to facilitator 616 in the form of a facilitator control panel.

Additionally or alternatively, and again, strictly as examples, the session summary metrics might include a stream of real-time summary metrics (e.g., the shown real-time summary stream 641). Moreover, such a stream of real-time summary metrics might be provided to individual user devices, where the particular calculations of a particular summary metric is customized to a particular user and/or their user device. Some embodiments provide for delivering user-specific engagement summaries 647 to specific users at their user devices.

As heretofore mentioned, one function of the facilitator is to enhance overall contributor engagement. One way to do that is to provide real-time metrics and/or real-time engagement summaries to the facilitator in his or her facilitator control panel, and then leave it to the facilitator to prod certain contributors for more interaction. Another way to prod certain contributors for more interaction is to provide the certain particular contributors with hints as to how they can more fully participate. A system configured to provide the certain particular contributors with system-generated engagement enhancement hints (e.g., recommendations) is shown and described as pertains to FIG. 6C.

Figure 6C:
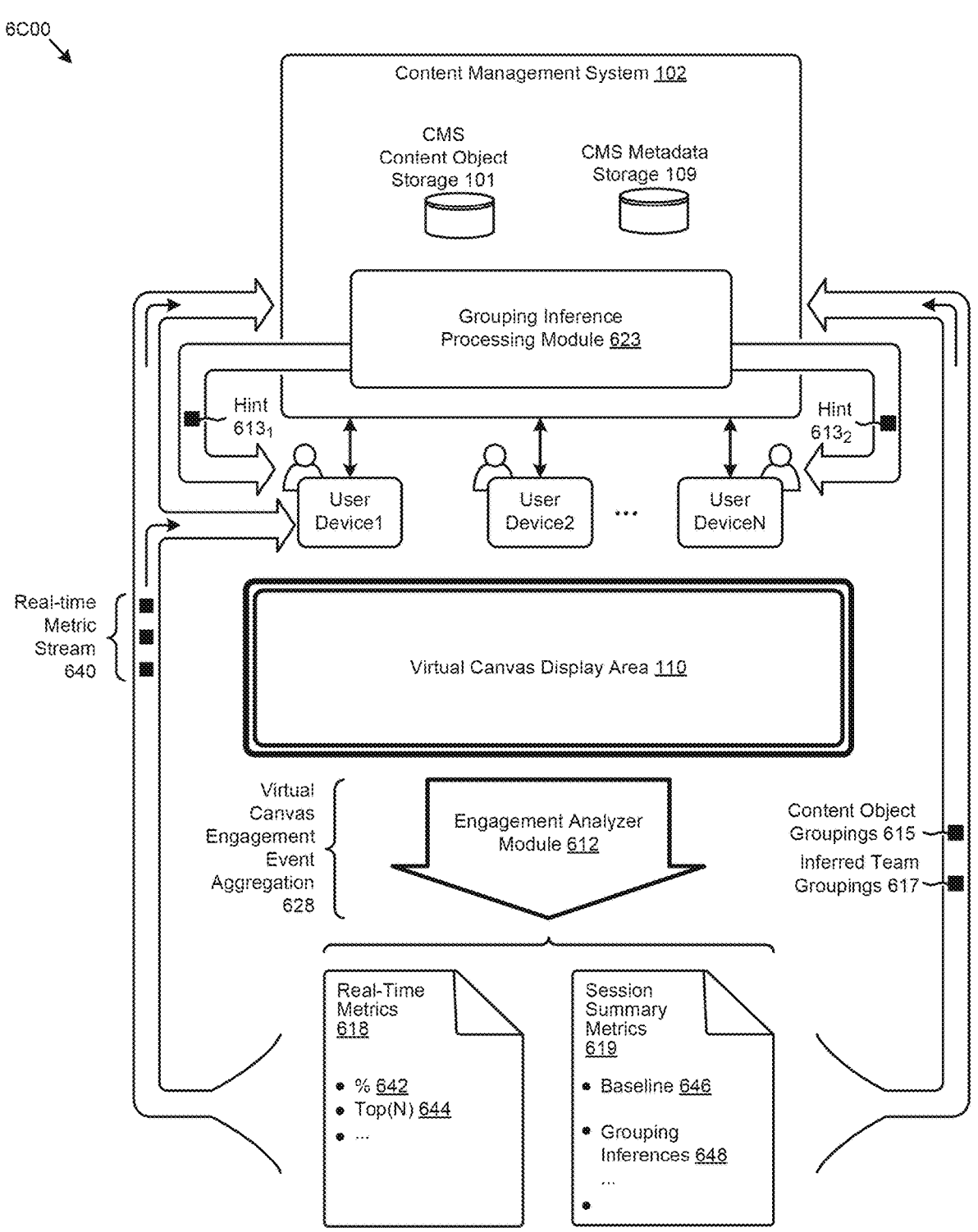
FIG. 6C depicts an example virtual canvas ecosystem that is configured to provide a stream of engagement enhancement hints to participants in a virtual canvas session, according to an embodiment.

FIG. 6C depicts an example virtual canvas ecosystem that is configured to provide a stream of engagement enhancement hints to participants in a virtual canvas session. As an option, one or more variations of virtual canvas ecosystem 6C00 or any aspect thereof may be implemented in the context of the architecture and functionality of the embodiments described herein and/or in any environment.

This figure is being presented to illustrate how a content management system 102 can be configured with a grouping inference processing module 623. As heretofore discussed, the interaction event measurement layer 608 of FIG. 6A, and/or the interaction event capture layer 606 of FIG. 6A is distributed across many user devices. This is because these interaction events occur at respective user devices, therefore it is convenient to capture interaction events at the user device. This is appropriate for initial capture of interaction events, however the function of aggregation of interaction events is conveniently implemented at some centralized point in the ecosystem where all engagement events from all participants' user devices can be received, stored and analyzed. One such centralized point in the ecosystem is the engagement analyzer module 612 and such an engagement analyzer module can formulate certain inferences (e.g., inferences pertaining to groupings, inferences pertaining to workflows, etc.). However, at least inasmuch as the CMS has a wealth of information about team members and content objects, it might be felicitous to situate a grouping module inside of the content management system. Such a grouping module is shown in FIG. 6C as grouping inference processing module 623.

As shown, engagement analyzer module 612 produces session summary metrics 619, which in turn may include grouping inferences 648. Strictly as examples, grouping inferences might include suggested content object groupings 615 and inferred team groupings 617. In the data flow of FIG. 6C, the content object groupings and inferred team groupings derive solely from individual or aggregated virtual canvas engagement events. However, such suggestions of groupings that derive solely from individual or aggregated virtual canvas engagement events can be at least potentially enriched by information stored at the CMS. For example, although an inferred team constituency might be a 'good' and 'valid' inference (e.g., based on the individual or aggregated virtual canvas engagement events) it might happen that there are additional individuals who should be included in the team. The CMS has a wealth of information pertaining to teams in the form of collaboration groups as well as a wealth of information pertaining to specific individuals who are associated with workflows of the CMS. As such, suggestions of groupings that derive solely from individual or aggregated virtual canvas engagement events can be ratified, cross-referenced, and/or augmented based on information stored at the CMS. For example, if user $U_1$ and user $U_2$ are strongly engaged (e.g., as measured by their individual and aggregated interaction events), and it turns out that user $U_1$ and user $U_2$ are both listed in two different in collaboration groups that both list user $U_5$, then that fact can be delivered to any/all of the participants as hints such as the shown hint $613_1$ and hint $613_2$.

In some scenarios, a hint may take the form of a suggestion to invite additional people into the collaboration session. In other scenarios, a hint may take the form of a suggestion to invite additional people into the collaboration session, where the invitation is determined, at least in part, on an engagement score being higher than some threshold. It should be noted that any user of a collaboration system may have an engagement score even before the beginning of a particular online collaboration session. This is because the CMS keeps track of connections between CMS users and documents as well as connections between CMS users.

Further details regarding general approaches to using connection graphs are described in U.S. application Ser. No. 10,922,282 titled "ON-DEMAND COLLABORATION USER INTERFACES" filed on Feb. 16, 2021, which is hereby incorporated by reference in its entirety.

The foregoing hints are merely for illustration of hints that derive from queries over a content management system. There are many other hints that could be automatically generated using a system such as is depicted in the virtual canvas ecosystem 6C00. Again, and strictly as examples, hints might take the form of actions for the facilitator to take (e.g., tell Bob to "wake up"), and/or hints might take the form of actions for a particular participant to take (e.g., "Get closer to the microphone,", or "Be more watchful not to speak over your colleagues,", or "Use the 'Add' tools to upload materials that support your position," etc.)

Figure 7A:
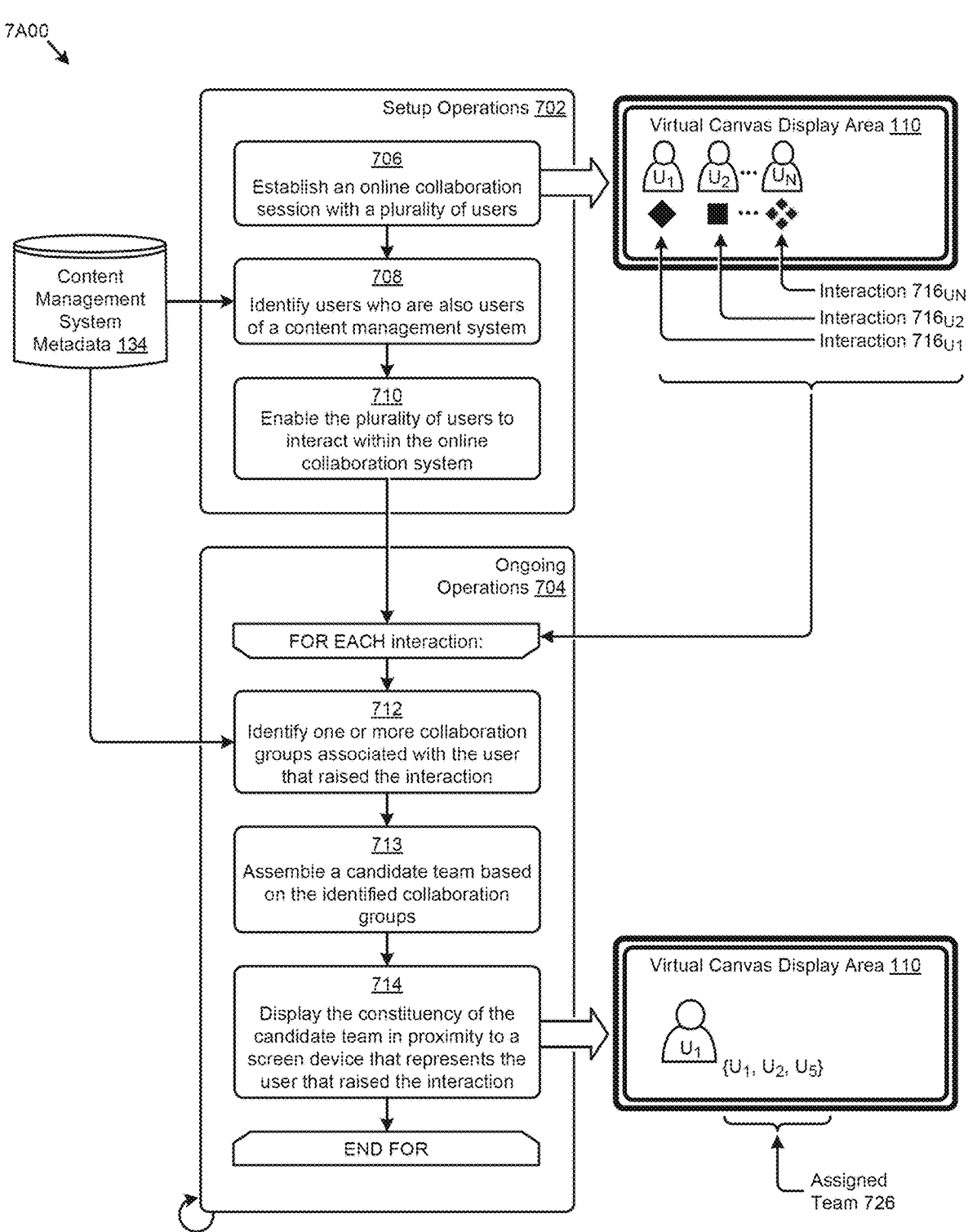
FIG. 7A depicts a virtual canvas session engagement analysis technique as used in systems that infer team groupings based on virtual canvas user interactions, according to an embodiment.

Any or all of the foregoing techniques to ratify, cross-reference, and/or augment an inference can be implemented in a data flow such as is shown and described as pertains to FIG. 7A.

FIG. 7A depicts a virtual canvas session engagement analysis technique as used in systems that infer team groupings based on virtual canvas user interactions. As an option, one or more variations of virtual canvas session engagement analysis technique 7A00 or any aspect thereof may be implemented in the context of the architecture and functionality of the embodiments described herein and/or in any environment.

The dataflow of FIG. 7A includes setup operations 702 and a loop for ongoing operations 704. The setup operations serve to establish an online collaboration session that allows multiple participants to interact with each other during the course of the online collaboration session (step 706). Metadata of the content management system (e.g., content management system metadata 134) is consulted to identify (at step 708) any/all of the participants who are also registered users of the content management system. This is because knowing which participants are also users of the content management system facilitates querying the CMS for additional information about those participants, which additional information might not be available merely from information that originates from the online collaboration session.

Regardless of whether or not a particular participant is or is not a registered user of the CMS, the setup operations, specifically step 710, serve to enable the users to interact within the virtual collaboration system.

Now, referring again to step 706, when the online collaboration session is established, a virtual canvas display area 110 is configured to permit the plurality of users to interact with each other. Any one or more techniques for event aggregation (e.g., virtual canvas engagement event aggregation 628 of FIG. 6C) can be employed to codify aggregated virtual canvas events into a form that can be used in an iteration loop. As shown, ongoing operations 704 includes a FOR EACH loop that iterates individually over each of the aggregated individual interactions (e.g., interaction $716_{U1}$, interaction $716_{U2}$, . . . , interaction $716_{UN}$). For each individual interaction, and based on information retrieved from the CMS (e.g., based on a query to the content management system), step 712 serves to identify collaboration groups that are associated with the particular user that raised the subject interaction. Step 713 then considers all of the CMS users who are in any of the identified collaboration groups. Various set and/or list operations (e.g., unions, duplicate removal, intersections, ordering, etc.) are performed so as to assemble candidate team(s) based on the identified collaboration groups. At step 714, the constituency of the candidate team(s) is displayed in proximity to the user screen device (e.g., photo, avatar, text box, etc.) corresponding to the user. In this case, user $U_1$ sees assigned team 726 via a screen device (e.g., a collection of user IDs) that is displayed in the virtual canvas display area. Of course there are some implementations where a display area separate from the virtual canvas display area 110 is provided. In some cases, the assigned team screen devices are presented in a scrolling area that continuously presents real-time hints.

Further details regarding general approaches to presenting real-time hints are described in U.S. Publication No. 2019-0108114, which is hereby incorporated by reference in its entirety.

There are many ways for candidate team(s) to be automatically proposed. Moreover there are myriad optimization techniques that result in highly-effective teams. Strictly as an example, team constituency can be optimized based on a historical pattern of a particular team or sub-team, where the team or sub-team has a track record of completing action items on time. As another example, team constituency can be optimized based on constituting the team using the topmost active participants. As yet another example, team constituency can be optimized based on constituting the team using a connections graph that is maintained by the CMS.

Further details regarding general approaches to using connection graphs are described in U.S. application Ser. No. 10,922,282 titled "ON-DEMAND COLLABORATION USER INTERFACES" filed on Feb. 16, 2021, which is hereby incorporated by reference in its entirety.

It should be noted that when the system is successful at forming a team based on a concept and/or based on a participant's association with a particular workflow, it follows that tasks pertaining the concept or workflow can be automatically assigned to the team members.

FIG. 7B depicts an interaction event enrichment technique as used in systems that infer emit recommendations based on virtual canvas user interactions. As an option, one or more variations of interaction event enrichment technique 7B00 or any aspect thereof may be implemented in the context of the architecture and functionality of the embodiments described herein and/or in any environment.

The figure is being presented to illustrate one way that CMS metadata can be used to augment the information drawn from interactions over a virtual canvas. More specifically, a flowchart is being presented to illustrate one way that CMS metadata can be used in conjunction with various interactions over a virtual canvas to generate and emit recommendations.

The shown flow can be entered and carried out any number of times during an online collaboration session. Moreover, the recommendations emitted can be delivered for display on a virtual canvas display area 110 at any moment in time. In some configurations, the recommendations are displayed only on the canvas display area belonging to the facilitator. In some configurations, the recommendations are displayed only on the canvas display area belonging to only specific pairs of the participants (e.g., a subject participant 764 and a corresponding paired participant 766). The flow operates generally by forming participant pairs, which pairs are formed in real time based on contemporaneous interaction events (step 752 and step 754). Then, for each participant pairing, a CMS is consulted (step 756). More specifically, the CMS is interrogated (e.g., via a query 765) so as to obtain additional information (e.g., from content management system metadata 134) that corresponds to one or both members of the participant pair. The data returned (e.g., enrichment data 762) might include a listing of workflows to which both members of the participant pair are assigned. Or, the data returned might include a listing of content objects over which both members of the participant pair have interacted within some specified historical timeframe. There might be one or multiple common touchpoints for any given participant pair, or there might be no common touchpoints for any given participant pair. In the case that there are one or multiple common touchpoints for a given participant pair, it can be inferred that those participants might work well together, and should be considered to be placed in the same team. Many such types of inferences can be made (step 758), and many recommendations or hints corresponding to the inferences can be emitted (step 760).

Strictly as examples, recommendations or hints corresponding to the inferences might carry the semantics of, "Bob and Sally should be assigned the task currently being discussed", or "Bob and Sally do not yet have any touch-points."

The decision as to which virtual canvas display area the recommendations should be routed to can be made using any known technique. In some cases the decision as to which virtual canvas display area the recommendations should be routed to can be made based on heuristics and/or based on the membership of the participant pairs. In some cases, the decision as to which virtual canvas display area the recommendations should be routed to can be made based on security considerations. In some configurations, the decision of what items to display in a virtual canvas display area of a particular participant can be made based on one or more security policies. One way to determine and enforce what items to display (or not to display) in a virtual canvas display area of a particular participant is shown and described as pertains to FIG. 8.

Figure 8A:
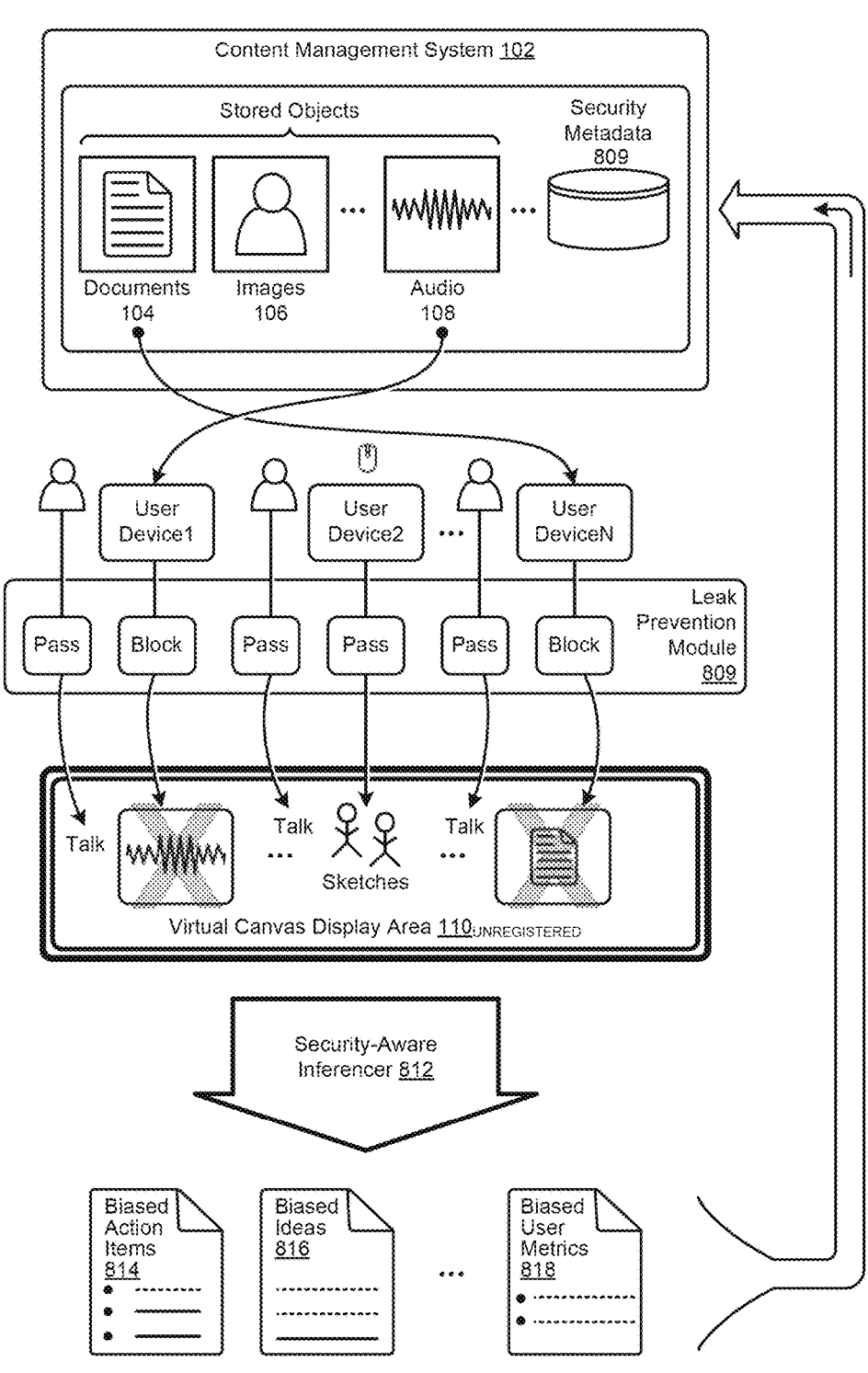
FIG. 8A exemplifies an online collaboration environment that is configured to enforce security properties imposed on content objects of a content management system, according to an embodiment.

FIG. 8A exemplifies an online collaboration environment that is configured to enforce security properties imposed on content objects of a content management system. As an option, one or more variations of online collaboration environment 8A00 or any aspect thereof may be implemented in the context of the architecture and functionality of the embodiments described herein and/or in any environment.

This figure is being presented to illustrate how the sensitivity of information can be honored during an online collaboration session. More specifically, the figure shows how a leak prevention module 809 can be deeply integrated with any/all of the facilities of content management system 102. Still more specifically the figure shows how a leak prevention module 809 can be situated between a content management system and virtual canvas display area. In this juxtaposition, if a user, for example, user2 at user device2, were to upload certain content objects (e.g., document 104 and/or audio 108) to the session, it might be that some of the other participants in the session do not possess sufficient access rights to view or otherwise access the content objects. As shown, it is possible that one or more of the participants in the session are not even registered users of the CMS. In such situations, the uploaded content object needs to be handled in a manner that prevents leakage of the information in the content objects. As shown, leak prevention module 809 is configured to be able to individually manage any number of virtual canvases. Any particular individual virtual canvas might be void of information that is leak-protected. Alternatively, any particular individual virtual canvas might display only an image (e.g., a sound file icon with an 'X' through it, a document icon with an 'X' through it, etc.) such that the leak-protected information (e.g., information that is blocked) by the leak prevention module is not compromised.

In this specific example, only one virtual canvas is showing in the figure (virtual canvas display area 110$_{UNREGIS-TERED}$), however there are as many virtual canvases as there are participants, and each individual virtual canvas is managed individually.

Now, consider the situation where, during the same CMS session, at least some of the virtual canvases are populated with less information than other virtual canvases in the same session. In this situation, engagement metrics would need to be normalized so as not to unfairly penalize a participant just because they are not interacting in the session. Accordingly, to account for this possibility, this embodiment implements a security-aware inferencer 812. The security-aware inferencer has sufficient information to be able to adjust (e.g., bias or normalize or suppress) its outputs. Strictly as an example, it might happen that rather than giving the participant a low score for participation, instead, the security-aware inferencer 812 might output biased user metrics 818 that take into account that the participant had somewhat less or fewer materials to consider during the session. The notion that the participant had somewhat less or fewer materials to consider during the session might also apply to biased action items 814 and/or biased ideas 816 as well. In fact, some embodiments implement a feedback loop from the security-aware inferencer back to the leak prevention module 809. Such a feedback loop serves to reduce or eliminate the possibility that derivative works (e.g., action items, ideas) might have been derived from blocked content.

As can be appreciated, participant interactions over a virtual canvas can take place over a long period of time. Accordingly, there may be many virtual canvas assets (e.g., content object uploads, inferences, annotations, participant interactions, etc.) that can be gathered and persisted in storage.

FIG. 8B1 and FIG. 8B2 depict possible operation flows that are configured to save virtual canvas assets and a corresponding manifest.

FIG. 8B1 is being presented to illustrate how a variety of virtual canvas assets can be saved to a content management system. FIG. 8B2 is being presented to illustrate how a saved collection of virtual canvas assets can be brought from persistent storage into a newly animated session.

FIG. 8B1 shows a possible operation flow that commences when a session ends (e.g., shown as session end event 840), and ends when a gathered set of virtual canvas assets have been stored into the CMS (step 854). To ensure that all assets of the session are gathered, step 842 waits until all background tasks (e.g., representation conversion tasks, language translation tasks, and/or distillation of virtual canvas session interactions, etc.) have completed. When all such background tasks have completed the inferencer is then able to processes the results of the background tasks (step 844), possibly emitting further inferences. Operations are then undertaken to codify the full set of inferences that may have been emitted during the session (step 846), codify the then-current canvas state (step 848) and codify any events (step 850) that may have occurred during the session. When all of the assets have been codified, asset manifest 853 is generated (step 852) and the assets are saved to persistent storage of the CMS (step 854) to create a stored virtual canvas session 855.

The asset manifest may include references to content objects together with corresponding metadata that describes the origination and promulgation of content objects. More specifically, the asset manifest may include references to content objects that were referenced during the session, but were only presented to some of the participants due to security-related limitations. As such, the security of the virtual canvas is maintained even if the virtual canvas is accessed at a later moment in time.

Once the virtual canvas has been persisted, it can be reanimated (e.g., re-displayed in a new virtual canvas session) upon a request by any authorized user. Moreover, the reanimated virtual canvas can be further edited, and saved again, and so on. A new session (or many new sessions) can be reanimated based on receipt of a participation request 858. The participation request can be raised by any user, and the request will be honored based on a sufficiency of access rights and/or privileges. The act of reanimating a virtual canvas can include the steps of locating the virtual canvas assets manifest and corresponding virtual canvas assets (step 860), then displaying the canvas assets into a virtual canvas display area (step 862). In some embodiments, the virtual canvas final state is initially presented in the display area. In other embodiments, the virtual canvas state as was present at inception of the corresponding original session is displayed in the display area. In some embodiments a play/pause button and fast forward/reverse buttons are presented on the user's device such that the user can selectively replay any part of the saved virtual canvas.

As heretofore mentioned, the virtual canvas is saved to the CMS (e.g., as a content object or collection of content objects) and as such, it can be edited. An edit request 856 can be used to reanimate a saved virtual canvas. Step 864 serves to continuously respond to participant interactions. In some embodiments, a first user can invite a second user into a session of a reanimated virtual canvas. When the session ends, an event such as session end event 840 is raised, and the reanimated virtual canvas is processed as per the flow of FIG. 8B1.

ADDITIONAL EMBODIMENTS OF THE DISCLOSURE

Instruction Code Examples

FIG. 9A depicts a system 9A00 as an arrangement of computing modules that are interconnected so as to operate cooperatively to implement certain of the herein-disclosed embodiments. This and other embodiments present particular arrangements of elements that, individually or as combined, serve to form improved technological processes for integrating virtual meeting facilities with a content management system. The partitioning of system 9A00 is merely illustrative and other partitions are possible. As an option, the system 9A00 may be implemented in the context of the architecture and functionality of the embodiments described herein. Of course, however, the system 9A00 or any operation therein may be carried out in any desired environment.

The system 9A00 comprises at least one processor and at least one memory, the memory serving to store program instructions corresponding to the operations of the system. As shown, an operation can be implemented in whole or in part using program instructions accessible by a module. The modules are connected to a communication path 9A05, and any operation can communicate with any other operations over communication path 9A05. The modules of the system can, individually or in combination, perform method operations within system 9A00. Any operations performed within system 9A00 may be performed in any order unless as may be specified in the claims.

The shown embodiment implements a portion of a computer system, presented as system 9A00, comprising one or more computer processors to execute a set of program code instructions (module 9A10) and modules for accessing memory to hold program code instructions to perform: invoking an online collaboration session that periodically updates a plurality of participant-specific virtual canvas renderings on a respective plurality of user devices corresponding to a plurality of participants in the online collaboration session (module 9A20); receiving, into the online meeting session, at least a portion of a content object of the content management system such that at least some of the plurality of participants can perform online collaboration session interactions over the portion of the content object (module 9A30); modifying the content object or its corresponding metadata in the content management system by (module 9A40); generating, in response to analysis of the online collaboration session interactions taken over the at least one content object by any of the plurality of participants, one or more content management system control instructions (module 9A50); and sending at least some of the content management system control instructions to the content management system (module 9A60).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

FIG. 9B depicts a system 9B00 as an arrangement of computing modules that are interconnected so as to operate cooperatively to implement certain of the herein-disclosed embodiments. The partitioning of system 9B00 is merely illustrative and other partitions are possible. As an option, the system 9B00 may be implemented in the context of the architecture and functionality of the embodiments described herein. Of course, however, the system 9B00 or any operation therein may be carried out in any desired environment.

The system 9B00 comprises at least one processor and at least one memory, the memory serving to store program instructions corresponding to the operations of the system. As shown, an operation can be implemented in whole or in part using program instructions accessible by a module. The modules are connected to a communication path 9B05, and any operation can communicate with any other operations over communication path 9B05. The modules of the system can, individually or in combination, perform method operations within system 9B00. Any operations performed within system 9B00 may be performed in any order unless as may be specified in the claims.

The shown embodiment implements a portion of a computer system, presented as system 9B00, comprising one or more computer processors to execute a set of program code instructions (module 9B10) and modules for accessing memory to hold program code instructions to perform: invoking an online collaboration session that periodically updates a plurality of participant-specific virtual canvas renderings on a respective plurality of user devices corresponding to a plurality of participants in the online collaboration session (module 9B20); observing online collaboration session interactions by a plurality of participants in the online collaboration session (module 9B30); retrieving information from the content management system by (module 9B40); generating, in response to analysis of the online collaboration session interactions, one or more content management system control instructions (module 9B50); and sending at least some of the content management system control instructions to the content management system (module 9B60).

SYSTEM ARCHITECTURE OVERVIEW

Additional System Architecture Examples

Figure 10A:
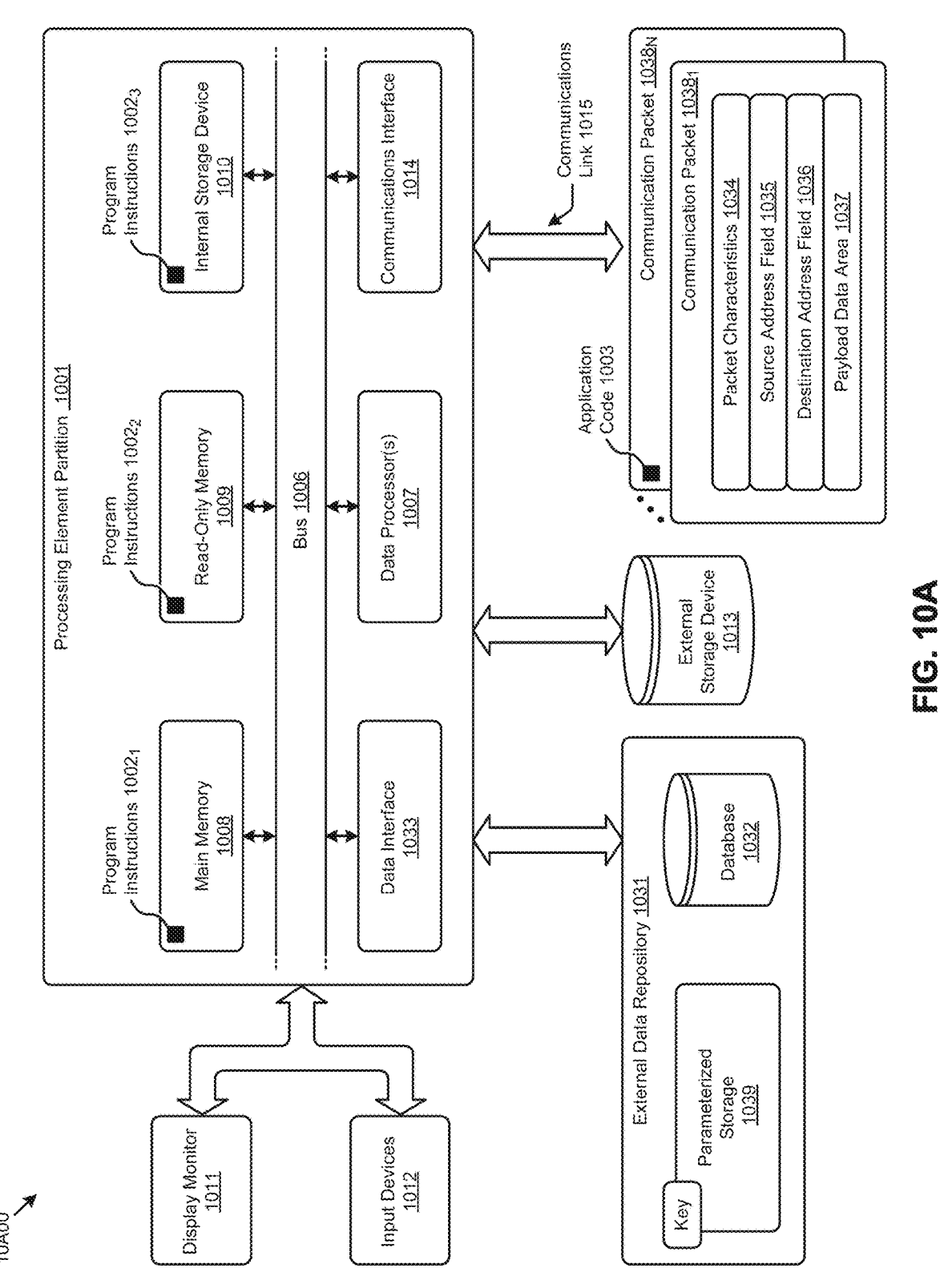
FIG. 10A and FIG. 10B present block diagrams of computer system architectures having components suitable for implementing embodiments of the present disclosure and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013

(e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program instructions contained in a memory. Such instructions (e.g., program instructions $1002_1$, program instructions $1002_2$, program instructions $1002_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet 10381, communication packet 1038N) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein, refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program instructions may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

As used herein, a "module" can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to real-time control of a content management system based on participant interactions with an online virtual canvas user interface. A module may include one or more state machines and/or combinational logic used to implement or facilitate the operational and/or performance characteristics pertaining to real-time control of a content management system based on participant interactions with an online virtual canvas user interface.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of real-time control of a content management system based on participant interactions with an online virtual canvas user interface). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to real-time control of a content management system based on participant interactions with an online virtual canvas user interface, and/or for improving the way data is manipulated when performing computerized operations pertaining to using the facilities of a content management system to improve the quality of collaborative interactions during online meeting sessions.

Figure 10B:
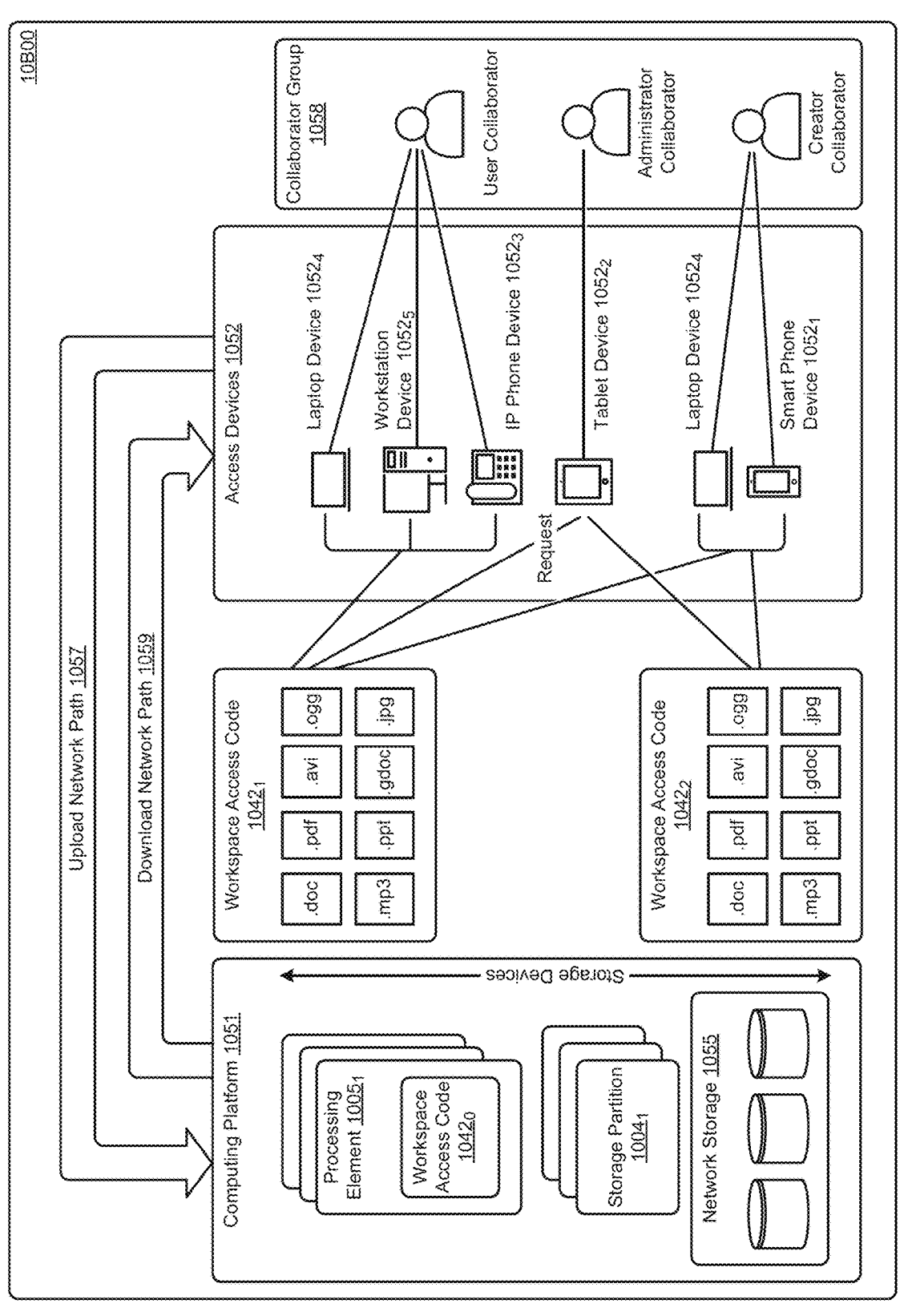

FIG. 10B depicts a block diagram of an instance of a cloud-based environment 10B00. Such a cloud-based environment supports access to workspaces through the execution of workspace access code (e.g., workspace access code 1042$_0$, workspace access code 1042$_1$, and workspace access code 1042$_2$). Workspace access code can be executed on any of access devices 1052 (e.g., laptop device 1052$_4$, workstation device 1052$_5$, IP phone device 1052$_3$, tablet device 1052$_2$, smart phone device 1052$_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 1058, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element 1005$_1$). The workspace access code can interface with storage devices such as networked storage 1055. Storage of workspaces and/or any constituent files or objects, and/or any other code or scripts or data can be stored in any one or more storage partitions (e.g., storage partition 1004$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:

presenting an online virtual canvas as an active area of an online meeting facility that renders participant-specific online virtual canvas interactions from a respective plurality of user devices in an online meeting;

identifying, at a content management system (CMS), an annotation with respect to a content object, wherein the annotation is created in a second online virtual canvas from a second user device, and the annotation is created in or over the content object uploaded from the content management system CMS for display on a first online virtual canvas by a first user for collaboration on the content object in the online meeting; and facilitating the participant-specific online virtual canvas interactions over the content object between at least the first online virtual canvas and the second online virtual canvas on the online meeting facility while the content object is hosted by the CMS based at least in part upon a content management system CMS command that is generated based at least in part upon meanings derived from the participant-specific online virtual canvas interactions, facilitating the participant-specific online virtual canvas interactions comprising:

determining, based at least in part upon the meanings derived from the participant- specific online virtual canvas interactions, whether the CMS is to apply a change to the content object or to apply the change to the metadata associated with the content object, wherein the annotation made in the second online virtual canvas results in the change in the CMS with respect to the content object;

when it is determined that the CMS is to apply the change to the content object, generating the CMS command for execution by the CMS at least by performing a first translation task on the annotation to match a first canonical representation of the annotation to the CMS command;

when it is determined that the CMS is to apply the change to the metadata, generating the CMS command at least by performing a second translation task on the annotation to match a second canonical representation of the annotation to the CMS command, wherein the first or second canonical representations of the annotation are matched to the command at least by accessing a data structure having a plurality of canonical representations to perform a lookup operation based on the first or second canonical representation of the annotation, the data structure associating canonical representations of interaction events to respective CMS commands, and the first and the second translation tasks are determined based at least in part upon whether the CMS is to apply the change to the content object or to the metadata;

executing the CMS command at the CMS to apply the change based at least in part upon the annotation received at the CMS; and uploading data pertaining to at least the change from the CMS to a first user device for the first user to interact with the content object with respect to the annotation on the first online virtual canvas.

2. The method of claim 1, wherein the content management system command comprises an instruction to add, into the content management system, a first content object that comprises an agenda, or a second content object that comprises an inferred action item, or a third content object that comprises session summary metrics.

3. The method of claim 2, wherein the agenda is derived from a text annotation or speech-to-text annotation from the second user.

4. The method of claim 1, wherein the first or the second online virtual canvas is configured to display at least a portion of the content object of the content management system concurrently with display of the annotation.

5. The method of claim 4, further comprising:

rendering a live video or audio stream that originates from at least one of the plurality of user devices, or further comprising rendering at least an avatar of either the first user or the second user; and converting the annotation at least by performing an object recognition operation or an optical character recognition operation on the annotation, wherein the annotation comprises a hand-drawn sketch that is transmitted from the second online virtual canvas in a form of second electronic signals, and the second electronic signals are transduced into first electronic signals that are audible or perceivable by the first user on the first online virtual canvas.

6. The method of claim 1, wherein the annotation in or over the content object is made using a native application that was provided by the CMS and was used to open the content object.

7. The method of claim 1, wherein the annotation in or over the content object is made using a non-native application provided by the online meeting facility.

8. The method of claim 1, further comprising: classifying at least some of annotations as being at least one of a comment on a portion of the content object, a highlight of the portion of the content object, or an edit to the portion of the content object.

9. The method of claim 1, further comprising: selecting one or more individual ones of annotations as one or more candidate interactions.

10. The method of claim 9, further comprising translating at least one of the one or more candidate interactions into one or more commands at least by matching the one or more individual ones of the annotations to corresponding CMS commands.

11. The method of claim 9, wherein at least one annotation of the annotations causes the change to one or more collaboration groups, and the change corresponds to adding or removing one or more users from the one or more collaboration groups.

12. The method of claim 1, wherein the content management system command comprises an instruction to identify a CMS user who is associated with any of the participant-specific online virtual canvas interactions.

13. The method of claim 1, further comprising:

displaying availability of one or more tools on at least one of the respective plurality of user devices, wherein at least one of the one or more tools comprises at least a tool to upload the content object.

14. The method of claim 1, wherein at least one of content management system commands comprises an instruction to store, into the content management system, a separate content object that derives from a user device.

15. The method of claim 1, further comprising storing at least some virtual canvas assets into persistent storage.

16. The method of claim 15, further comprising reanimating a stored virtual canvas session by presenting a representation of at least some of the virtual canvas assets on a display of a user device.

17. The method of claim 1, further comprising:

determining, based at least in part upon the meanings derived from the participant-specific online virtual canvas interactions, whether the CMS is to apply the change to a collaboration group for the plurality of user devices, to the content object, or to the metadata; and when it is determined that the CMS is to apply the change to the collaboration group, generating the CMS command at least by performing a third translation task on the annotation, wherein the third translation task is determined based at least in part upon whether the CMS is to apply the change to the content object, to the metadata, or to the collaboration group, wherein the annotation made in the second online virtual canvas results in a change in the CMS with respect to the collaboration group, and a setting of the collaboration group is used to control access to the content object for users in the collaboration group.

18. A non-transitory computer readable medium having stored thereon a sequence of instructions which, when stored in memory and executed by one or more processors causes the one or more processors to perform a set of acts, the set of acts comprising:

presenting an online virtual canvas as an active area of an online meeting facility that renders participant-specific online virtual canvas interactions from a respective plurality of user devices in an online meeting;

identifying, at a content management system (CMS), an annotation with respect to a content object, wherein the annotation is created in a second online virtual canvas from a second user device, and the annotation is created in or over the content object uploaded from the content management system CMS for display on a first online virtual canvas by a first user for collaboration on the content object in the online meeting; and facilitating the participant-specific online virtual canvas interactions over the content object between at least the first online virtual canvas and the second online virtual canvas on the online meeting facility while the content object is hosted by the CMS based at least in part upon a content management system CMS command that is generated based at least in part upon meanings derived from the participant-specific online virtual canvas inter-actions, facilitating the participant-specific online vir-tual canvas interactions comprising:

determining, based at least in part upon the meanings derived from the participant-specific online virtual can-vas interactions, whether the CMS is to apply a change to the content object or to apply the change to the metadata associated with the content object, wherein the annotation made in the second online virtual canvas results in the change in the CMS with respect to the content object;

when it is determined that the CMS is to apply the change to the content object, generating the CMS command for execution by the CMS at least by performing a first translation task on the annotation to match a first canonical representation of the annotation to the CMS command;

when it is determined that the CMS is to apply the change to the metadata, generating the CMS command at least by performing a second translation task on the anno-tation to match a second canonical representation of the annotation to the CMS command, wherein the first or second canonical representations of the annotation are matched to the command at least by accessing a data structure having a plurality of canonical representations to perform a lookup operation based on the first or second canonical representation of the annotation, the data structure associating canonical representations of interaction events to respective CMS commands, and the first and the second translation tasks are determined based at least in part upon whether the CMS is to apply the change to the content object or to the metadata;

executing the CMS command at the CMS to apply the change based at least in part upon the annotation received at the CMS; and uploading data pertaining to at least the change from the CMS to a first user device for the first user to interact with the content object with respect to the annotation on the first online virtual canvas.

19. The non-transitory computer readable medium of claim 18, wherein the content management system com-mand comprises an instruction to add, into the content management system, a first content object that comprises a stored virtual canvas session.

20. A system comprising:

a storage medium having stored thereon a sequence of instructions; and one or more processors that execute the sequence of instructions to cause the one or more processors to perform a set of acts, the set of acts comprising:

presenting an online virtual canvas as an active area of an online meeting facility that renders participant-specific online virtual canvas interactions from a respective plurality of user devices in an online meeting;

identifying, at a content management system (CMS), an annotation with respect to a content object, wherein the annotation is created in a second online virtual canvas from a second user device, and the annotation is created in or over the content object uploaded from the content management system CMS for display on a first online virtual canvas by a first user for collaboration on the content object in the online meeting; and facilitating the participant-specific online virtual canvas interactions over the content object between at least the first online virtual canvas and the second online virtual canvas on the online meeting facility while the content object is hosted by the CMS based at least in part upon a content management system CMS command that is generated based at least in part upon meanings derived from the participant-specific online virtual canvas inter-actions, facilitating the participant-specific online vir-tual canvas interactions comprising:

determining, based at least in part upon the meanings derived from the participant-specific online virtual can-vas interactions, whether the CMS is to apply a change to the content object or to apply the change to the metadata associated with the content object, wherein the annotation made in the second online virtual canvas results in the change in the CMS with respect to the content object;

when it is determined that the CMS is to apply the change to the content object, generating the CMS command for execution by the CMS at least by performing a first translation task on the annotation to match a first canonical representation of the annotation to the CMS command;

when it is determined that the CMS is to apply the change to the metadata, generating the CMS command at least by performing a second translation task on the anno-tation to match a second canonical representation of the annotation to the CMS command, wherein the first or second canonical representations of the annotation are matched to the command at least by accessing a data structure having a plurality of canonical representations to perform a lookup operation based on the first or second canonical representation of the annotation, the data structure associating canonical representations of interaction events to respective CMS commands, and the first and the second translation tasks are determined based at least in part upon whether the CMS is to apply the change to the content object or to the metadata;

executing the CMS command at the CMS to apply the change based at least in part upon the annotation received at the CMS; and uploading data pertaining to at least the change from the CMS to a first user device for the first user to interact with the content object with respect to the annotation on the first online virtual canvas.

21. The system of claim 20, wherein the content man-agement system command comprises an instruction to add, into the content management system, a first content object that comprises a stored virtual canvas session.

* * * * *